(12) United States Patent
Komkov et al.

(10) Patent No.: US 12,541,675 B2
(45) Date of Patent: Feb. 3, 2026

(54) DISTANCES BETWEEN DISTRIBUTIONS FOR THE BELONGING-TO-THE-DISTRIBUTION MEASUREMENT OF THE IMAGE

(71) Applicant: HUAWEI TECHNOLOGIES CO., LTD., Shenzhen (CN)

(72) Inventors: Stepan Alekseevich Komkov, Moscow (RU); Aleksandr Aleksandrovich Petiushko, Moscow (RU); Ivan Leonidovich Mazurenko, Moscow (RU); Jiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 18/173,591

(22) Filed: Feb. 23, 2023

(65) Prior Publication Data
US 2023/0229897 A1 Jul. 20, 2023

Related U.S. Application Data

(63) Continuation of application No. PCT/RU2020/000450, filed on Aug. 25, 2020.

(51) Int. Cl.
*G06N 3/0499* (2023.01)
*G06V 10/82* (2022.01)
*G06V 40/16* (2022.01)

(52) U.S. Cl.
CPC ........... *G06N 3/0499* (2023.01); *G06V 10/82* (2022.01); *G06V 40/172* (2022.01)

(58) Field of Classification Search
CPC ...... G06F 18/22; G06N 3/0464; G06N 3/048; G06N 3/0499; G06N 3/0895; G06T 1/00;
(Continued)

(56) References Cited

U.S. PATENT DOCUMENTS 9,767,381 B2 9/2017 Rodríguez-Serrano et al.
10,346,464 B2 7/2019 Ye
(Continued)

FOREIGN PATENT DOCUMENTS

CN 109460777 A 3/2019
CN 109472240 A 3/2019
CN 109977887 A 7/2019

OTHER PUBLICATIONS

Herrmann et al: "Low-Resolution Convolutional Neural Networks for Video Face Recognition", IEEE, 2016 (Year: 2016).*
(Continued)

*Primary Examiner* — Ruiping Li
(74) *Attorney, Agent, or Firm* — Leydig, Voit & Mayer, Ltd.

(57) ABSTRACT

The present disclosure relates to processing input data by a neural network. Methods and apparatuses of some embodiments process the input data by at least one layer of the neural network and obtain thereby a feature tensor. Then, the distribution of the obtained feature tensors estimated. Another distribution is obtained. Such other distribution may be a distribution of another input data, or a distribution obtained by combining a plurality of distributions obtained for respective plurality of some input data. Then a distance value indicative of a distance between the two distributions is calculated and based thereon, a characteristic of the input data is determined. The characteristic may be pertinence to a certain class of data or a detection of out-of-distribution data or determination of reliability of a class determination or the like.

16 Claims, 11 Drawing Sheets

(58) Field of Classification Search
CPC .... G06V 10/454; G06V 10/761; G06V 10/82; G06V 40/172
See application file for complete search history.

(56) References Cited

U.S. PATENT DOCUMENTS 10,558,750 B2 2/2020 Lu et al.
2021/0374524 A1* 12/2021 Feng .................. G06F 18/2453

OTHER PUBLICATIONS

Hsu et al: "The Effect of Distance Function for NN Classifier with Local Binary Pattern Descriptors", 2018 (Year: 2018).*
Aizenbud et al.: "PCA-Based Out-of-Sample Extension for Dimensionality Reduction", 2015 (Year: 2015).*
Liang et al., "Enhancing the Reliability of Out-of-Distribution Image Detection in Neural Networks," Published as a conference paper at ICLR 2018, arXiv: 1706.02690v4 [cs.LG], XP081281629, total 27 pages (Feb. 25, 2018).
Grother et al., "Face Recognition Technology Evaluation (FRTE) Part 1: Verification," NISTIR XXXX Draft, National Institute of Standards and Technology, total 939 pages (Aug. 9, 2024).
Lee et al., "A Simple Unified Framework for Detecting Out-of-Distribution Samples and Adversarial Attacks," arXiv: 1807.03888v2 [stat.ML], XP081055670, total 20 pages (Oct. 27, 2018).
Dhamija et al., "Reducing Network Agnostophobia," arXiv: 1811.04110v2 [cs.CV], total 14 pages (Dec. 23, 2018).
Quintaniha et al., "Detecting Out-of-Distribution Samples Using Low-Order Deep Feature Statistics," Under review as a conference paper at ICLR 2019, XP055603220, total 17 pages (Nov. 19, 2018).
Ruff et al., "Deep One-Class Classification," Proceedings of the 35th International Conference on Machine Learning, total 10 pages (2018).
Sastry et al., "Detecting Out-of-Distribution Examples with In-Distribution Examples and Gram Matrices," arXiv: 1912.12510v2 [cs.LG], XP081575090, total 21 pages (Jan. 9, 2020).
Shu et al., "Unseen Class Discovery in Open-World Classification," arXiv: 1801.05609v1 [cs.LG], total 10 pages (Jan. 17, 2018).
Ditzler et al., "Hellinger Distance Based Drift Detection for Nonstationary Environments," 2011 IEEE Symposium on Computational Intelligence in Dynamic and Uncertain Environments (CIDUE), XP032003065, total 8 pages, Institute of Electrical and Electronics Engineers, New York, New York (Apr. 11, 2011).
Yoshihashi et al., "Classification-Reconstruction Learning for Open-Set Recognition," arXiv: 1812.04246v3 [cs.CV], total 11 pages (Oct. 6, 2019).
Oza et al., "C2AE: Class Conditioned Auto-Encoder for Open-set Recognition," arXiv: 1904.01198v1 [cs.CV], total 13 pages (Apr. 2, 2019).
Rudd et al., "The Extreme Value Machine," IEEE Transactions on Pattern Analysis and Machine Intelligence, arXiv: 1506.06112v4 [cs.LG], total 12 pages (May 21, 2017).
Yu et al., "Unsupervised Out-of-Distribution Detection by Maximum Classifier Discrepancy," total 9 pages (Oct. 27-Nov. 2, 2019).
Vyas et al., "Out-of-Distribution Detection Using an Ensemble of Self Supervised Leave-out Classifiers," total 15 pages (Sep. 8, 2018).
Hendrycks et al., "A Baseline for Detecting Misclassified and Out-of-Distribution Examples in Neural Networks," Published as a conference paper at ICLR 2017, arXiv: 1610.02136v3 [cs.NE], total 12 pages (Oct. 3, 2018).
Liang et al., "Enhancing the Reliability of Out-Of-Distribution Image Detection in Neural Networks," Published as a conference paper at ICLR 2018, arXiv: 1706.02690v5 [cs.LG], total 15 pages (Aug. 30, 2020).
Meller et al., "Image Classification with Feed-Forward Neural Networks," CEUR-WS.org/VOL-2694/p4.pdf, total 7 pages (May 20, 2020).
Bendale et al., "Towards Open Set Deep Networks," arXiv: 1511.06233v1 [cs.CV], total 14 pages (Nov. 19, 2015).
Shi et al., "Probabilistic Face Embeddings," arXiv: 1904.09658v4 [cs.CV], total 12 pages (Aug. 7, 2019).
Gómez et al., "Understanding Categorical Cross-Entropy Loss, Binary Cross-Entropy Loss, Softmax Loss, Logistic Loss, Focal Loss and all those confusing names," total 12 pages (May 23, 2018).
Lecun et al., "The MNIST Database of Handwritten Digits," URL: https://yann.lecun.com/exdb/mnist/, total 8 pages (Dec. 4, 2024).
"Weibull distribution," [online] https://en.wikipedia.org/wiki/Weibull_distribution, total 10 pages (Aug. 20, 2024).
"Understanding of Convolutional Neural Network (CNN)—Deep Learning," total 13 pages (Oct. 18, 2023).
"Hellinger distance," [online] https://en.wikipedia.org/wiki/Hellinger_distance, total 4 pages (Dec. 20, 2023).
Kumar, "Understanding Principal Component Analysis," total 10 pages (Jan. 2, 2018).
Pablo Ruiz: "Understanding and visualizing ResNets".Oct. 8, 2018, total 12 pages.
"Entropy (information theory)," [online] https://en.wikipedia.org/wiki/Entropy_(information_theory), total 15 pages (Aug. 22, 2024).

* cited by examiner

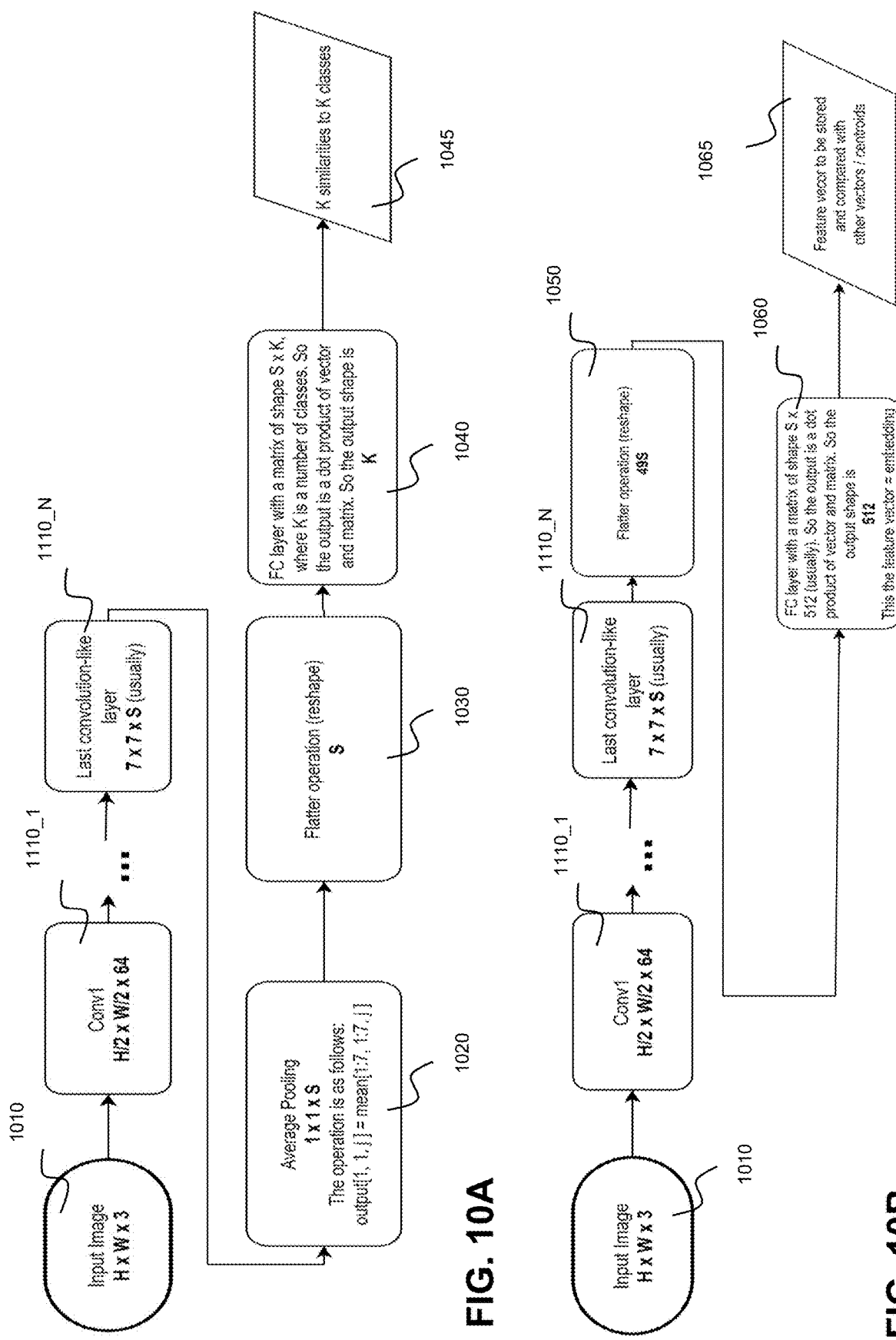

DISTANCES BETWEEN DISTRIBUTIONS FOR THE BELONGING-TO-THE-DISTRIBUTION MEASUREMENT OF THE IMAGE

CROSS-REFERENCE TO RELATED APPLICATIONS

This application is a continuation of International Application No. PCT/RU2020/000450, filed on Aug. 25, 2020, the disclosure of which is hereby incorporated by reference in its entirety.

TECHNICAL FIELD

Embodiments of the present application generally relate to the field of neural networks and processing by neural networks.

BACKGROUND

Neural networks have been recently used for various data classification tasks. With the improved hardware architectures, some neural networks have been deployed for instance for classification or recognition of image or video.

A neural network (NN) is a signal processing model which supports machine learning and which is modelled after a human brain, including multiple interconnected neurons. In neural network implementations, the signal at a connection between two neurons is a number, and the output of each neuron is computed by some non-linear function of the sum of its weighted inputs. The connections are called edges. Neurons and edges typically have a weight that adjusts as learning proceeds. The weight increases or decreases the strength of the signal at a connection. The non-linear function of the weighted sum is also referred to as "activation function" or a "transfer function of a neuron". In some simple implementations, the output may be binary, depending on whether or not the weighted sum exceeds some threshold, corresponding to a step function as the non-linear activation function. In other implementations, another activation functions may be used, such as a sigmoid or the like. Typically, neurons are aggregated into layers. Different layers may perform different transformations of their inputs. Signals travel from the first layer (the input layer), to the last layer (the output layer), possibly after traversing multiple layers. The weights are learned by training which may be performed by supervised or unsupervised learning. It is noted that the above-described model is only a general model. For specific applications, a neural network may have different processing stages which may correspond to a convolutional neural network (CNN) layers and which are adapted to the desired input such as an image or the like.

A feed-forward neural network is an artificial neural network wherein connections between the nodes do not form a cycle. Such NNs are typically used for data classification tasks. In the term Deep Neural Network (DNN), the adjective "deep" in deep learning comes from the use of multiple layers in the network. Deep learning is a class of machine learning algorithms using multiple layers to progressively extract higher level features from the raw input. For example, in image processing, lower layers may identify edges, while higher layers may identify the concepts relevant to a human such as digits or letters or faces or the like.

During DNN training, a labeled dataset of (x,y) pairs is used, where x is an input (e.g. image) of the model and y is a label of this input class. The training of the DNN is a process of searching for the best parameters for the parameterized model f(θ,·) such that $$\theta \approx \underset{\theta}{\mathrm{argmin}} \sum_{(x,y)} L(f(\theta, x), y).$$

Here, L is a loss function (loss). In the case of the classification task, f(x) decomposes as g∘h(x) (meaning that f(x) has the form of g(h(x))), where h(x) is a feature vector (embedding) obtained for the input and g(h(x)) is a vector of similarities between feature vector h(x) and the average feature vector c_y (centroid) for each class y. The similarity is a value of the similarity function between h(x) and c_y.

The closed-set scenario task is a task in which the same classes are recognizable during training phase and production (inference) phase. A typical commonly used loss for the closed-scenario is a cross-entropy (CE) loss function. This loss trains the model to make each embedding of the input closer to the centroid of the same class than to any other centroid. For the closed-set scenario, both functions h and g are used during the production.

CE is not so well-suited for the open-set scenario task (i.e. the task where also new classes are to be recognized during production) since for open-set tasks not only well-separate known classes are needed, but there should be also place kept for new classes in the embedding (feature vector) space. In this case, possibly, only function h is kept for an open set scenario. In other words, function h which estimates similarity during training may be replaced with a modified or extended function which estimates similarity between feature vectors without being fixed to predefined classes. The function h may be omitted completely and the output of the inference phase may be just the feature vector. The function h may also be reduce to merely distinguish between some key classes.

The obtained embeddings may be used outside the model, depending on the context of usage. For the production, a dissimilarity function that differs from the one used during training can be applied. In particular, the classes used in training do not have to be used during production. Even a single example (e.g., x_2) of a new class is sufficient to create new centroid. Accordingly, the similarity function is typically calculated between h(x) and h(x_2) instead of some c_y. Thereby, two (or more) objects are directly compared.

Regardless of the usage scenario, training process, and model architecture, there is a common issue for DNNs resulted by the limited training dataset. The issue is a predisposition of models to predict similar feature vectors for images regardless of the semantic meaning:
1) They have similar distributions of the pixel RGB-values and/or have the same middle-level semantics features (that may be unrelated to the features, which are actually used to recognition);
2) They are far from the common distribution of the training dataset.

There are several well-known examples that confirm the existence of the problem. First is the MNIST (Y. LeCun, C. Cortes, and Ch. J. C. Burges, "THE MNIST DATABASE of handwritten digits" available at http://yann.lecun.com/exdb/mnist/)—classical closed-set task of digit recognition. Models already achieved more than 99.5% accuracy rate for the MNIST at the beginning of the era of neural networks. Still, even the best solutions make the same mistakes: since there are no examples of "6" with the flat apex in the training dataset, models cannot predict the correct digit, if the a six with the flat top portion is entered.

As another example, the Low False-Positive Rate (Low FPR) Face Recognition (Face Rec) can be considered. This is an open-set task since each person is to be recognized among the persons captured with the surveillance camera. Open datasets suitable for the Face Rec model training mostly consist of the image of celebrities collected from the Internet. There is only a small number of old or baby celebrities. Thereby Face Rec model usually deals badly with baby or old face recognition.

SUMMARY

Embodiments of the present application provide apparatuses and methods, which may improve performance for input data similar to rare examples in training dataset distribution.

The foregoing and other objects are achieved by the subject matter of the independent claims. Further implementation forms are apparent from the dependent claims, the description and the figures.

According to an aspect, the disclosure relates to a method for processing first input data by a neural network, which is a feed-forward neural network. The method comprises processing the first input data by at least one layer of the neural network to obtain a first feature tensor; estimating a first distribution of the obtained first feature tensor; obtaining a second distribution; determining a distance value indicative of a distance between the first distribution and the second distribution; and determining a characteristic of the first input data based on the determined distance value.

The distance value indicative of a distance between the first distribution and the second distribution may be any value which correlates with distance. For example, it may be any dissimilarity or similarity metric. Typically, distance is considered to measure dissimilarity because with growing distance, the dissimilarity grows. However, distance may be also considered as similarity measure, but with an opposite sign/proportion—the higher the distance, the lower the similarity. Thus, in general, the distance value here may be obtained for instance by calculating a dissimilarity metric (or in general measure) or by calculating a similarity metric (or in general measure) because the results of both such metrics are indicative of the distance between the distributions.

With this approach, performance for input data similar to rare examples in training dataset distribution may be improved. Moreover, the additional evaluation of the first tensor distribution provides a flexible means for any pre-trained, open-set or closed-set tasks.

In an exemplary embodiment, the estimating of the first distribution includes obtaining a number, n, of value intervals of the first feature tensor values; and determining, for each of then value intervals, number of occurrences of values belonging to said value interval among the first feature tensor values.

This may be seen as corresponding to discretizing of the tensor distribution to n ticks. Such discretization provides for scalable complexity. The number n may be selected in accordance with the application and considerations including complexity (number of calculations necessary) and accuracy. For example, n may be adjustable.

For example, the obtaining of the n value intervals includes the number n based on the dimensions of the first feature tensor.

Adjusting n in this way enables taking into the feasible accuracy in terms of the amount of data available and the meaningful size and distribution of tics to which these data are assigned.

In addition, or alternatively, the obtaining of the n value intervals includes the determining the value interval length based on entropy of the first feature tensor values.

Adjusting the breadth of the ticks accordingly enables efficient distribution of the tick length with regard to the amount of the corresponding tensor feature values, e.g. such that the amount information per tick is approximately same.

According to an embodiment, in the determining of the characteristic of the first input data, the characteristic is at least one of a class among a plurality of predetermined classes of data, and whether or not the first input data belong to one of the predetermined classes of data.

The additional processing including evaluation of the distribution enables to improve the first data processing which may be an open-set classification, a closed-set classification as well as or alternatively to the out-of-distribution classification.

According to an exemplary implementation, the obtaining of the second distribution includes: processing of second input data by the at least one layer to obtain a second feature tensor; and estimating the second distribution of the obtained second feature tensor; wherein the determining of the characteristic of the first input data comprises determining similarity of the first input data to the second input data by a similarity metric being a function of said distance value.

In this way, the open-set classification may be performed, i.e. by comparing input data with other input data and building possibly new classes/clusters.

For example, the similarity metric is further a function of a feature tensor obtained by processing the first input data with all layers of the neural network and/or a feature tensor obtained by processing the second data with all layers of the neural network.

The classification task may be improved in this embodiment. In other words, the characteristics output by the neural network may be supplemented by the evaluation of the distribution functions or a certain tensor according to the embodiments of the present disclosure. The results may be combined, i.e. by applying weighting or some conditions based on thresholds.

In addition or alternatively, the function is a monotonically increasing function of said distance value.

Such characteristics enable consistent evaluation of neural network based task based on the distribution similarity.

In particular, in an exemplary implementation, the function $\psi$ is given by $\psi(s, d) = p_1(s) + w \cdot p_2(\min(d, \Theta))$, with $p_i(x) = x^{ai}$, wherein ai is a positive integer, i is 1 or 2, w is a predetermined weight factor, $\Theta$ is a predetermined maximum distance.

This exemplary function is monotonically increasing with the distance d and may be calculated easily.

For example, the second distribution is obtained by averaging of a plurality of distributions determined for respective plurality of input data belonging to a same class.

This feature enables employment of the distribution function comparison to the out-of-distribution detection which allows for rare input data detection and/or the corresponding action including estimating the reliability of neural network classification.

According to a possible implementation, the determining of the characteristic of the first input data includes: comparing the distance value with a threshold, and, based on the comparison, estimating reliability of the first input data belonging to said same class.

The reliability of classification provides information, which may enable to correctly interpret results of the neural network processing, and/or quality of training.

For example, the distance value is calculated based on Hellinger distance.

Hellinger distance is a measure particularly suited for comparison of distributions.

In particular, in an exemplary implementation, the distance value is calculated by approximating the Hellinger distance as a sum of squared differences projected to a space reduced by applying Principal Component Analysis (PCA).

This approach enables reduction of complexity of the additional processing introduced by the evaluation of the distribution.

The method may further comprise determining of said at least one layer of the neural network as the layer of which the output feature tensor provides the maximum classification accuracy.

This feature provides the possibility of adapting the evaluated tensor to the particular task. In other words, it enables finding of the layer which provides the most suitable distinction between the desired features of classification.

For example, the first input data is image data including c channels with c being an integer equal to or larger than 1.

The channels may be color and/or depth and/or motion or further channels.

Processing more channels may increase the accuracy of the processing, as additional information is processed.

In an embodiments, the steps of processing the first input data, estimating a first distribution of the obtained first feature tensor, and determining a distance value are performed separately for each channel c; and the determining of the characteristic of the first input data is based on an aggregation of the distance values determined for each channel.

Processing separate channels separately at first enables for better extraction of the respective characteristic features. The subsequent commination of the respective contributions of these channels may increase the accuracy of the evaluation.

According to an embodiment, any of the above-mentioned method is used for face recognition.

Face recognition, especially open-set, is a difficult task. The embodiments described above are very suitable to improve especially the reliability estimation of any face recognition method for rare inputs such as elderly persons or children, which may be less frequently present in the training data set.

According to an aspect, a signal processing apparatus is provided for processing first input data by a neural network, which is a feed-forward neural network, the signal processing apparatus comprising processing circuitry configured to: process the first input data by at least one layer of the neural network to obtain a first feature tensor; estimate a first distribution of the obtained first feature tensor; obtain a second distribution; determine a distance value indicative of a distance between the first distribution and the second distribution; and determine a characteristic of the first input data based on the determined distance value.

According to an aspect, a signal processing apparatus for processing first input data by a neural network, which is a feed-forward neural network, the signal processing apparatus comprising: a neural network for processing the first input data by at least one layer of the neural network to obtain a first feature tensor; a distribution estimator for estimating a first distribution of the obtained first feature tensor; an input for obtaining a second distribution; a distance determination unit for determining a distance value indicative of a distance between the first distribution and the second distribution; and a characteristic determination unit for determining a characteristic of the first input data based on the determined distance value.

According to an aspect, a computer-readable storage medium having stored thereon instructions that when executed cause one or more processors configured to code video data is proposed. The instructions cause the one or more processors to perform any of the methods mentioned above. The storage medium may be a non-transitory medium.

According to an aspect, the disclosure relates to a computer program comprising program code for performing any of the methods mentioned above or any possible embodiment described below when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

The following embodiments of the disclosure are described in more detail with reference to the attached figures and drawings, in which:

FIG. 10A is a schematic drawing illustrating a neural network architecture for closed-set image recognition;

FIG. 10B is a schematic drawing illustrating inference part of a neural network architecture for open-set image recognition.

Figure 1:
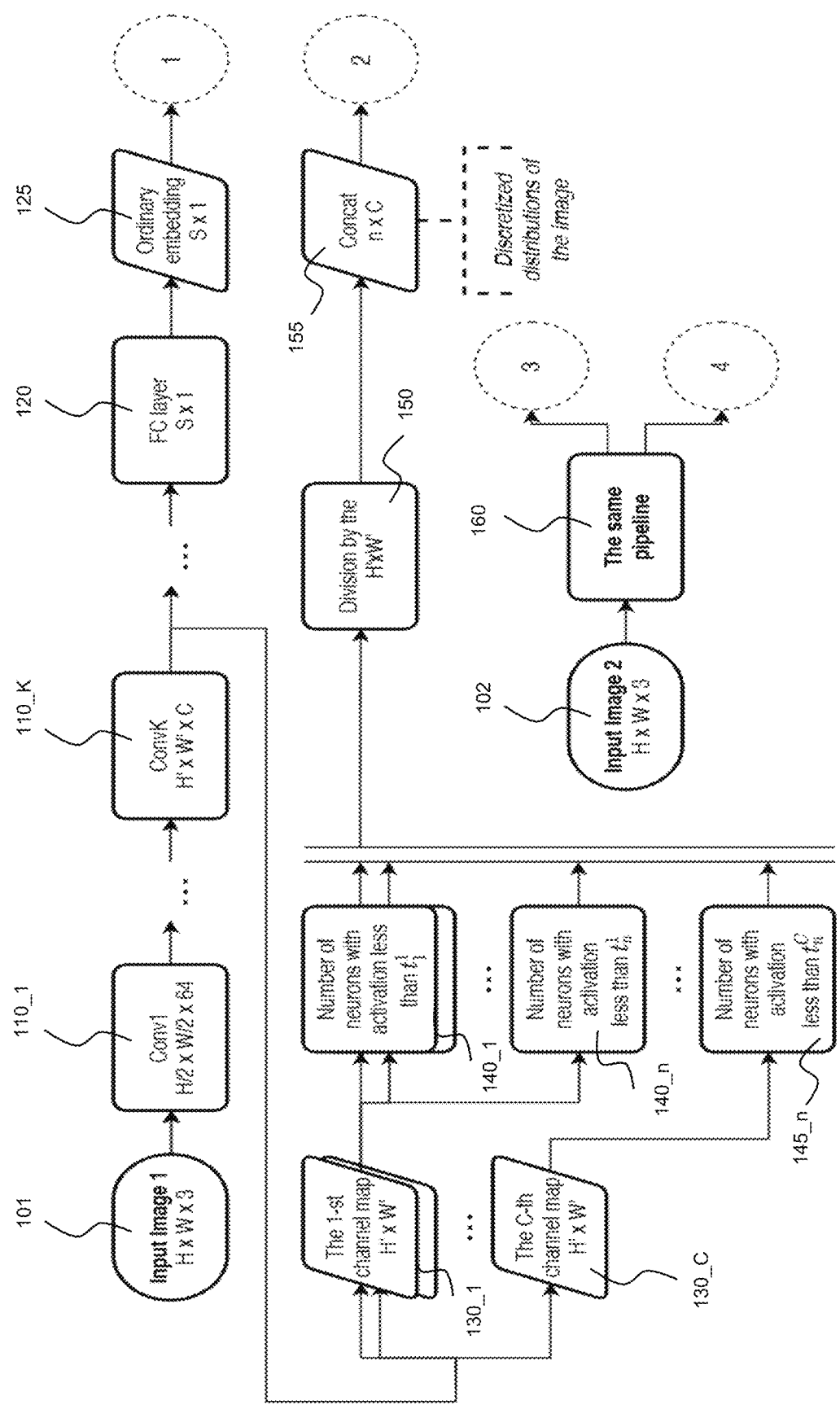
FIG. 1 is a schematic drawing illustrating functional blocks and signal flow for determining discrete distribution of features.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

According to an embodiment, input data is processed by a neural network with at least one intermediate layer. A tensor of a predetermined layer is analyzed for input data to obtain a discrete distribution function of the tensor features. The distribution function may then be used as a basis for further processing.

For example, for the purpose of open-set or closed-set classification, the distribution of the input data tensor may be compared with a similarly obtained distribution for other data. In case of closed-set classification, each class may be associated with a representative distribution of the tensor. The, the comparison between the input data tensor distribution and the representative tensor distribution for a class provides a measure (an indication) of compliance with that class.

Calculation of the distributions and their comparison or obtaining of an input data characteristics accordingly may be considered to constitute an additional processing with regard to the normal operation of the neural network. Results of such additional processing may be utilized in various different ways.

As will be described below in detail, the distributions obtained for two pieces of input data (their feature tensors) may be used to determine the distance value and used the distance value to modify the result of the normal operation of the neural network. For example, the NN may output some similarities to some predefined classes. By comparing the input data tensor distribution with representative class tensor distributions, a class with highest degree of compliance can be obtained. This may differ from the class determined by the NN. Thus, the classification may be modified, based on the result of the additional processing. Similarly, for open-set classification, the input data tensor distribution may be compared with data tensor distributions of other data input previously to obtain the distance value and the distance value may be used to modify similarity between NN-output feature vectors before comparing their similarity. This may improve the main rate of the model, e.g. accuracy. The obtained similarity function may improve testing results on big representative production test sets.

The additional processing may be used to or contribute to form a new class or assign the input data to previously formed classes. It may be used to estimate accuracy of the NN result or to detect out-of-distribution input data, or the like. In other words, the tensor distribution does not have to replace the neural network output which is actually meant to be used for classification purpose. The tensor distribution comparison is advantageously used in addition to the generic classification of the neural network. For example, both results can be weighted and/or the indication obtained by the tensor distribution comparison may be used to indicate reliability of the classification, or the like.

In addition or alternatively to improving classification (in particular for data kinds which are rare in the training set), the tensor distribution of the input data may be used to determine, for the input data, whether (or how much) the input data diverges from some predetermined distribution (e.g. average of distributions of training-set data or previous production input data the like). This embodiment may be advantageous if it is necessary to estimate how far the input is from the common distribution of the training dataset (i.e. is it out-of-the-distribution (OOD) example or not). This can be helpful for the uncertainty estimation or for the confidence estimation, too.

One of possible improvements of the embodiments of this disclosure relates to the problem of how to improve an already existing solution to increase its performance on rare examples in terms of the training dataset distribution. The present disclosure specifies an additional processing, which may be integrated with any existing (feed forward) neural network to improve its performance. This additional processing is independent of the training phase. Accordingly, it may be deployed in production at any device employing the neural network.

It is noted that the present disclosure does not necessarily target improving the main rate of the model, e.g. accuracy, True-Positive Rate (TPR), F1-measure, etc. in all scenarios For example, the OOD estimation is used to understand when the prediction (classification) can be trusted and/or to which extend. The out-of-the-distribution (or reliability) measurement can be seen as a consequence of the better distinction for the rare training set examples.

Figure 2:
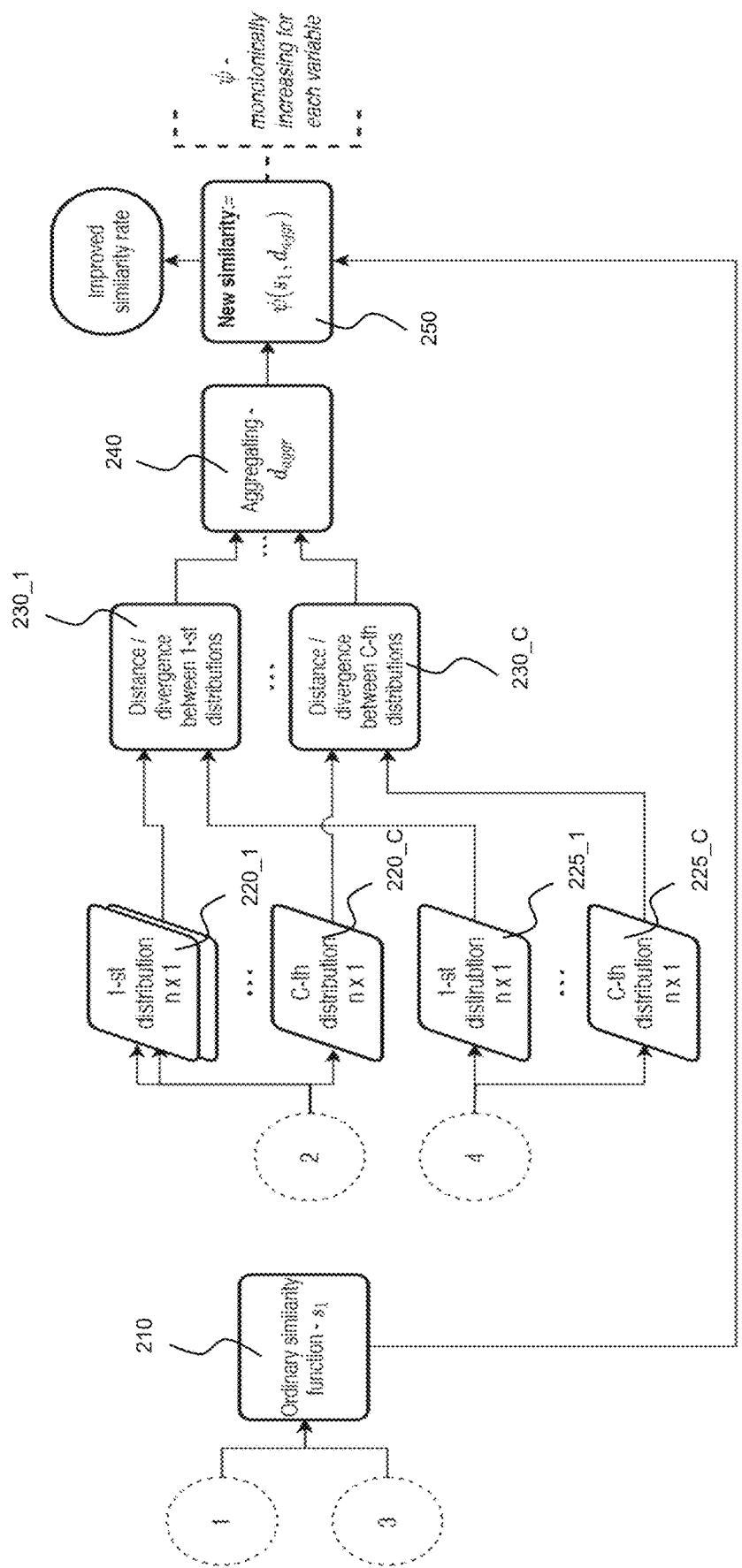
FIG. 2 is a schematic drawing illustrating functional blocks and signal flow for determining a modified similarity measure.

According to an embodiment, a method is provided for processing first input data by a neural network. For example, the neural network (NN) is a feed-forward neural network. The neural network may be a convolutional NN possibly applied to input data which is image data, as is illustrated in FIGS. 1 and 2 which show a particular exemplary implementation of the method. In FIG. 1, a first input image 101 may represent the first input data.

Figure 3:
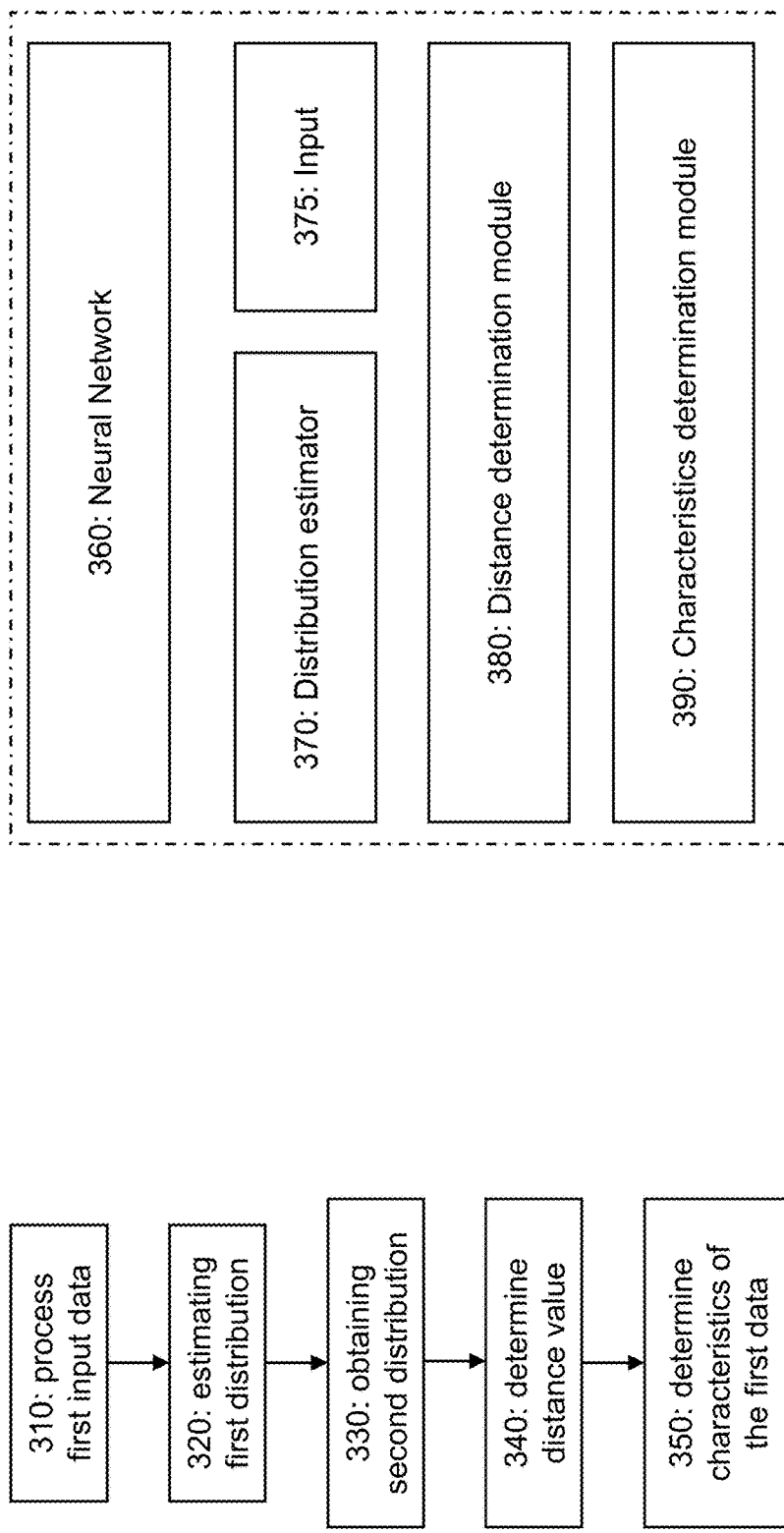
FIG. 3A is a flow chart illustrating a method according to an embodiment.
FIG. 3B is a block diagram illustrating a functional structure of an apparatus according to an embodiment.

The method is illustrated in FIG. 3A and comprises a step 310 of processing the first input data by at least one layer of the neural network to obtain a first feature tensor. This step may be implemented by steps 110_1 . . . 110_K and further, up to the possibly included final layer (fully-connected layer in this example) 120 of FIG. 1, which will be described in more detail below. In particular, processing the first input data by one or more layers of a neural network can be understood as extracting features from the first input data, e.g. extracting image features if the first data is image data. Output of one or more NN layers may be referred to as feature channel.

The method further comprises estimating 320 a first distribution of the obtained first feature tensor. This step may be implemented by steps 140_1 to 145_n, 150, and 155. Then a step 330 of obtaining a second distribution is performed. An example of such step may be implemented by step 160, representing the same pipe described in steps 110_1 to 155.

The method further includes a step 340 (corresponding e.g. to step 230_1 to 230_C) of determining a distance value indicative of a distance between the first distribution and the second distribution. The distance value may be for instance a metric such as a similarity or dissimilarity metric, as they both are indicative of (correlate with) the distance value Finally, the method comprises a step 350 of determining a characteristic of the first input data based on the determined distance value. An example of such step may be implemented by step 250. The determining of the characteristic may be, for instance, a classification, e.g. a determination of a class among a closed or opened number of classes. However, the present disclosure is not limited by classification. The determination may include determination of whether or not the first input data is an out of distribution data or ordinary data or with which confidence the first input data belongs to a class as will be explained below in more detail.

In contrast to the previous approaches, the embodiment described with reference to FIG. 3A may allow for the following effects. It targets the improvement of the basic goal of the model (e.g. accuracy; True Positive Ratio, TPR, at fixed False Positive Ratio, FPR; F1-measure, etc.). The suspicious data are not filtered out, but rather recognized better. The approach does not require any special training procedures, but is rather capable of employing any training. Thus, it is implementable for the production phase in any pre-trained model. Even an OOD detection can be performed without any additional training. The parameters of the approach can be tuned in the end device. In addition, it is usable for closed-set as well as open-set scenarios as will be shown below. The approach has implementations that may only negligibly increase the computational time when running using already tuned parameters.

FIGS. 1 and 2 show an example of the NN being a Convolutional Neural Networks (CNN). The CNN takes a 3D tensor 101 as an input. The 3D tensor is in this example an image with width W, height H and with C components (channels). The C components in this example may be three color components such as red (R), green (G), blue (B). However, in general, the components may belong to another color space than RGB. For instance, YUV or YCbCr or other color spaces. Moreover, the components do not have to be color components, the may include different components such as depth map or another feature map or a combination of color and feature maps. The components are generally usually referred to as channels.

In other words, the dimensions of the tensor in FIG. 1 are referred to as height (H), which is the height of the image in pixels (samples), width (W), which is the width of the image in pixels, and the channels number (C), which is 3 for the RGB image. The term sample and pixel here is used interchangeably. A sample of data is sometimes referred to as pixel in case of images and videos, corresponding to the pixel matrix structure of the typical sensor and display devices.

The neural network applies some transformations to the tensor that usually reduce the width and height of the tensor and usually increase the number of channels of the tensor. However, in general, some layers may also increase the width and height and reduce the number of channels, or flatten the tensor into a 1D vector or the like. Finally, a 1×1×C' tensor is obtained. This tensor is a feature vector, with one feature per one channel (out of C' channels). As a next step, a Fully Connected (FC) layer operation may be applied to the output. It is noted that in general C may be equal to C', but C' may also be smaller or larger. Typically, in CNNs used for object recognition, C' gets larger. An FC layer 120 is typically used for embedding the complex features extracted from previous layers into the feature vector with a desired dimension (size). The output 125 of the FC layer 120 is feature vector of a size These vectors may be further used to determine new class or pertinence of the input data to an existing class, or the like.

It is noted that the NN does not have to have any FC layer, and my directly output a feature vector (embedding) of the last (e.g. convolutional) NN layer. It is further noted that herein, the feature tensor may be also referred to as feature maps (with certain height and width) for different channels. Such tensor may be vectorized, and thus, referred to as a feature vector. In other words, the term "embedding" herein is used for any grouping of data such as feature vector, feature tensor or the like.

The values of the intermediate tensors during CNN inference are typically called middle-level features since they are not used for the final embedding, but the final features are calculated based on these features. Thus, they contain useful semantic information about the input, which can recognize the target characteristics after some additional processing.

The values of some intermediate tensor of size H'×W'×C (assuming that C is not reduced here to C') are used to evaluate distribution functions of the (one or more) middle-level features for the proceeded input. The height H' and width W' will typically have a size different from the size of H and W. If a CNN is employed, H' and W' will be typically smaller than H and W respectively, as the CNN typically applies subsampling in each step to extract features at different levels.

It is noted that a distribution function is a term typically meaning a continuous probability distribution of a random variable. Such distribution function is generally not known for the first input data and has thus to be estimated. The estimation may be performed based on counting frequency of occurrences of certain values, e.g. occurrences of values which belong to certain intervals, also referred to as ticks. Such distribution function is calculated in some fixed points and thereby a discretized distribution is obtained, e.g. of the middle-level semantics for each input. Note that the discretized distribution can be evaluated not only for one input but also for the whole class or for the whole dataset by the arithmetic averaging of distributions.

The obtained distributions may be compared using any distributions distance/divergence/similarity measures. In this way, high similarities between objects with close distributions of the middle-level features may be identified and penalized to prevent the issues described above. In other words, the similarity function is modified in a way to make it more accurate for OOD examples and hence improve the whole recognition rate.

In FIG. 1, the input processing part includes an input of the image 101. The image 101 may be obtained from any source such as camera, streaming service, a storage of any kind, or the like.

The processing further includes application of operations the first 110_1 and further layers, including K-th layer 110_K of middle-level NN layers from the original model to the first input data. By the processing, the series of tensors with shapes $H_1 \times W_1 \times C_1, \ldots, H' \times W' \times C, \ldots, 1 \times 1 \times S$ is obtained, where S is the size of the usual (ordinary) embedding 125 which is the result of the last final layer 120. K in this example is 1 or more, up to the total number of layers of the NN. It is noted that the present disclosure is applicable for neural networks with any number (one or more) of layers including the final layer and possibly further one or more middle layers.

The intermediate tensor with shape $H' \times W' \times C$ after the K-th layer 110_K is split into C tensors 130_1 to 130_C with shapes $H' \times W'$ along the channels axis. In functional blocks 140_1 to 140_$n$ for the tensor 130_1, the occurrences or the proportions of values that are lesser than $t_1^c, \ldots, t_n^c$ are counted. The counting is done independently for each channel c. This is illustrated by functional block 145_$n$ in which counting for C-th channel is performed, for the highest (n-th) value. The division 150 serves for normalization purposes. In this case, the normalization is normalization by the total number of occurrences counted per channel C, which corresponds to the size of the tensor, i.e. in this case $H' \times W'$.

In functional block 155, the normalized discretized distribution is concatenated into vectors of shape $n \times 1$. The proportion of the values on channel c that are lesser than $t_i^c$ is denoted as $F_c(t_i^c)$. This corresponds to estimation of a cumulative distribution function of values of the K-th tensor in c-th channel. Index i goes over the discretized value intervals, e.g. i may be an integer equal to or larger than one and equal to or smaller than n. A cumulative distribution function is an increasing function with possible values between 0 and 1. In general, a cumulative distribution function is 0 in negative infinity and 1 in positive infinity.

Each vector of the shape $n \times 1$ indicates a new distribution function $$F_c^{new}(x) = \begin{cases} 1, & x \geq t_n^c, \\ \max\{F_c(t_i^c) \mid x \geq t_i^c\}, & t_n^c > x \geq t_1^c, \\ 0, & x < t_1^c. \end{cases}$$

These are discretized distributions for each channel c of the intermediate tensor. All vectors obtained for all the respective C channels are concatenated into a tensor of shape $n \times C$. Here, c is equal to or larger than 1 and equal to or larger than C.

In this example, separate channel-wise distributions are estimated, since each value on one channel is calculated using the same formula but with (spatially) different parts of the image as an input. Thus, each discretized distribution indicates the distribution of one specific semantic feature on the input.

In FIG. 1, the output 1 (indicated by a dashed circle with inscribed 1) is the result of processing the first input data with the neural network layers 110_1, ... 110_K, ... 120. The output 2 (indicated by a dashed circle with inscribed 2) is discretized distribution for C channels having n value intervals (ticks).

In summary, the discretized distribution is computed by obtaining a number, n, of value intervals of the first feature tensor values, and by determining, for each of the n value intervals, number of occurrences of values belonging to said value interval among the first feature tensor values. In the exemplary implementation shown above, the discretized distribution is a cumulative distribution function (cdf) in which the value intervals overlap in a specific manner, i.e. one value may fall into several intervals. However, the present disclosure is not limited to the distribution being a cdf. Rather, the distribution may be an estimation of a probability density function (pdf) for which the intervals do not overlap.

The original embedding $f(x)$ (output 1) may be concatenated with the tensor (output 2) with discretized distributions $D(x)$ as the new embedding $e(x) = [f(x), D(x)]$ for certain input data.

FIG. 2 relates to a similarity calculation part. After obtaining the estimated distribution, the distribution may be further evaluated for various purposes, e.g. compared to some other (estimated or ideal) distributions. The evaluation may be performed by determining (calculating or computing) a similarity function value or a dissimilarity or divergence value, or in general any distance measure or the like. For instance, a distance measure between the first data and second data may be determined. In order to do so, in the Example of FIG. 1, the second input data 102 is processed by a processing pipe 160 to obtain the output 3 (indicated by a dashed circle with inscribed 3) being the result of processing the second input data with the neural network layers 110_1, ... 110_K, ... 120. The output 4 (indicated by a dashed circle with inscribed 4) is discretized distribution of the K-th tensor of the second input data 102 for C channels having n value intervals. The discretization may correspond to the processing 130-155 of FIG. 1.

In other words, the obtaining of the second distribution includes: processing of second input data by the at least one layer to obtain a second feature tensor; and estimating the second distribution of the obtained second feature tensor. The determining of the characteristic of the first input data may then comprise determining similarity of the first input data to the second input data by a similarity metric being a function of said distance value as is further described below with reference to FIG. 2.

However, the present disclosure is not limited to comparison of distribution for two input images. Rather, the comparison may be done, for example, with some centroid such as the average discretized distributions of all examples of a certain class or the like.

An exemplary similarity calculation part receives new embeddings $e(x_1)$ and $e(x_2)$. The new embeddings $e(x_1)$ and $e(x_2)$ are then split to the original embeddings $f(x_i)$ (output 1) and $f(x_2)$ (output 3) and discretized distributions $D(x_1)$ (output 2) and $D(x_2)$ (output 4). Here, the term embedding refers to feature vector, which is a grouping or set or arrangement of feature data. In general, a discretized distribution also corresponds to an embedding. In particular, discretized distribution may be considered to be a feature vector with length n.

Then, outputs 1 and 3 are used to calculate 210 the value $s_1$ of a (first) similarity function between the original embeddings $f(x_1)$ and $f(x_2)$. The outputs 2 and 4 are further use to determine a new similarity value. In particular, the tensor with discretized distributions is split to obtain C separate vectors 220_1 to 220_C with shape $n \times 1$ for each channel map. The splitting here is only illustrative and it does not have to be performed. For example, the input processing described with reference to FIG. 1 does not have to perform the concatenation, so that splitting is not necessary either.

As a next step, a distribution dissimilarity or distance or divergence $d_1$ is calculated 230_1 between the distributions from the first channel maps:

$$d_1 = H(F_1^{new}(x_1), F_1^{new}(x_2)),$$

where $H(\cdot,\cdot)$ is a distribution distance/divergence and $F_1^{input}(\cdot)$ is the discretized distribution function for c=1. This is performed for each c=1 . . . C, until the distribution distance/divergence $d_c$ between the distributions is obtained 230_C for each of the C-th channel maps.

The distribution distances/divergences may then be aggregated or combined 240 to the $d_{aggr}$ scalar. Then, a new (second) similarity function $(s_1, d_{aggr})$ is calculated 250. The second similarity function $\psi(s_1, d_{aggr})$ may be designed to be a monotonically increasing function for each variable $s_1$, $d_{aggr}$.

It is noted that the similarity $s_1$ is not necessarily calculated for another (second) input data 102. As mentioned above, the comparison may be performed with an average training dataset distribution, in which case, detection of OOD examples can be easily achieved. In particular, OOD are those examples whose distributions are far from the average distribution of the dataset. The distance may be measured by the newly obtained (second) similarity.

In other words, according to an embodiment, the second distribution is obtained by averaging of a plurality of distributions determined for respective plurality of input data belonging to a same class. For example, the determining of the characteristic of the first input data may include comparing the distance value with a threshold, and, based on the comparison, estimating reliability of the first input data belonging to said same class.

In these embodiments, the classes may correspond to classes set-up in any pre-training. The set of classes may be closed, i.e. comprising a predefined and pre-trained number of classes which does not change in time. However, the present disclosure is also applicable for open models with possibility of defining new classes during training or even production (processing).

It is noted that in general, a class is not necessary a recognizable class such as classes labeled by real-world names e.g. person, car, tree, person A, person B, etc. Rather, a class may be some meta-class such as blurred image, child photo, or even classes the meaning of which is not immediately apparent.

Figure 4:
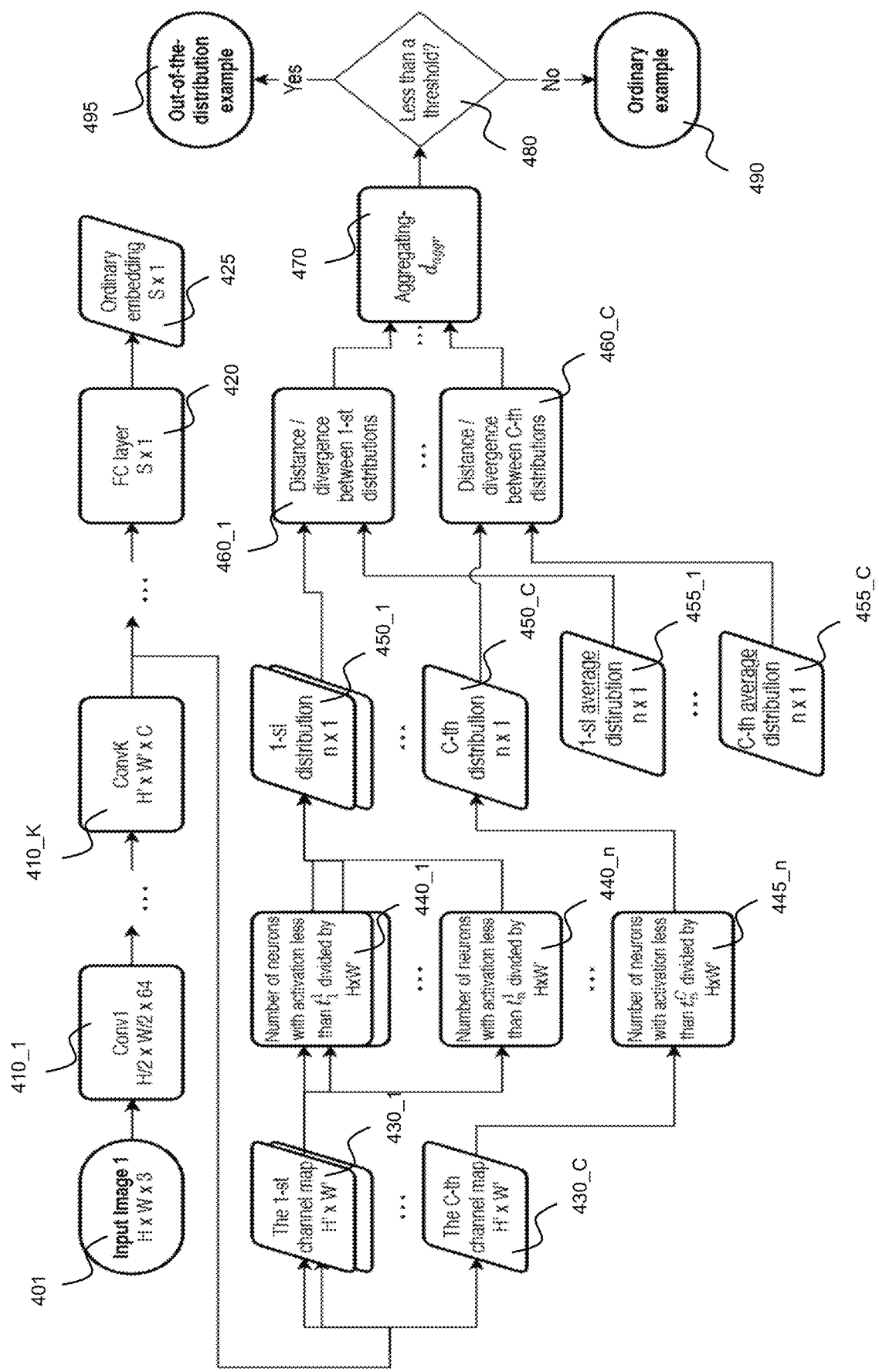
FIG. 4 is a schematic drawing illustrating functional blocks and signal flow for distinguishing between ordinary and out-of-distribution inputs.

An example of an OOD detection will be now described based on a functional block scheme shown in FIG. 4.

In the example of FIG. 4, an input image 401 corresponds to the first input data. The input image 401 in this example is an input image similar to the image 101, having height of H samples and width of W samples, as well as 3 color channels (components). As mentioned above, the present disclosure is not limited by 3 color channels. In general, the present disclosure also works with only one channel, such as a luminance channel. There may be 2, 3, or more color channels. Alternatively or in addition, other than color channels may be used such as depth channel, motion flow channel or any other feature channel.

The input image 401 is input to a convolutional neural network with layers 410_1, . . . , 410_K, . . . , 420. In other words, operations from the CNN are applied consistently to the input and, thereby, the series of tensors with shapes $H_1 \times W_1 \times C_1$, $H' \times W' \times C$ are obtained. As can seen in FIG. 4, $H_1 \times W_1 \times C_1$ in this example corresponds to $H/2 \times W/2 \times 64$. In this example, the result of the processing by the CNN after processing by K layers (410_K corresponding to K-th layer) is used to derive the discretized distribution. In order to do so, the intermediate tensor with shape $H' \times W' \times C$ is split into C tensors with shapes $H' \times W'$ along the channels axis. This is similar processing as was shown with reference to FIG. 1. As mentioned above, there do not need to be plural channels. In the implementations with one channel, no splitting is performed.

In functional blocks 440_1 to 440_n and further functional blocks up to 445_n the estimation of the distribution function is performed. Similarly as above, the proportions of values that are less than $t_1^c$, . . . , $t_n^c$ are determined independently for each channel c, and the results for each channel are concatenate into vectors of shape n×1. The number (or the proportion, when normalized) of the values on channel c that are less than $t_i^c$ for i=1 to n is the estimated distribution function denoted as $F_c(t_i^c)$.

Each vector of the shape n×1 indicates the new distribution function (in this case cumulative distribution function):

$$F_c^{new}(x) = \begin{cases} 1, & x \geq t_n^c, \\ \max\{F_c(t_i^c) \mid x \geq t_i^c\}, & t_n^c > x \geq t_1^c, \\ 0, & x < t_1^c. \end{cases}$$

These $F_c^{new}(x)$ are discretized distributions for each channel c of the intermediate tensor. All vectors are concatenated into a tensor of shape n×C.

The obtained distribution(s) 450_1 to 450_C of the first input data (in this example the input image 401) is/are then compared 460_1 to 460_C to the average distribution(s) 455_1 to 455_C of the training dataset and the results are combined 470 into $d_{aggr}$ (which may be a scalar). The combination (aggregation) may be, for instance a calculation of divergence or dissimilarity between the distribution(s) 450_1 to 450_C of the first image 401 and the average distributions 455_1 to 455_C. Such divergence or dissimilarity may be any measure reflecting distance between two distributions. The measure may be calculated per channel, resulting in C results. These C results may then be combined e.g. by means of calculating an average or a weighted average, or by calculating any norm such as minimum or maximum or the like.

In the functional block 480, the, the characteristic value $d_{aggr}$ is compared with a threshold. If $d_{aggr}$ is bigger than the threshold, then the first input data (e.g. image 401) is an OOD data 495, since it (better said its distribution of an intermediate tensor) is far from the common distribution (of the intermediate tensor) 455_1 to 455_C of the training dataset. If $d_{aggr}$ is not bigger than the threshold, then the first input data is ordinary data (not OOD data) 490. If equality applies, it may be defined by a fixed convention that the first data is OOD. However, the convention may alternatively be that the first data is not ODD.

It is noted that with the above approach, it may happen that even a part of the training examples will be marked as OOD examples. This would be correct since some of the training examples may be rare in terms of the middle-level features (characteristics of the K-th intermediate tensor) that they contain.

In the following, some further exemplary detailed parameters and implementations for both above-mentioned embodiments (FIG. 1/FIG. 2, FIG. 4) are discussed. There is a number of parameters which may be set to improve performance for particular applications, such as the index K of the intermediate tensor used to determine the distribution(s), points (value ranges) for the distribution function calculation and their number (amount), distributions distance/divergence measure (function), or the like. The selection of threshold for OOD detection 480 may be performed empirically, based on the training set and the desired application.

In general, the present disclosure provides an approach which enables not only more accurately determine outliers, but which may also reduce the computational complexity and thus increase efficiency. For example, all the discretized distributions comparisons may be reduce to one binary operation. This may be achieved, for example if the distance value is calculated based on Hellinger distance. The Hellinger distance may be calculated between the C (C being an integer equal to or greater than 1) first distributions and the respective corresponding second distributions. In such case, the resulting value is a scalar which corresponds to the characteristic value of the first input data. In other words, the tensor with discretized distributions may be reduced from n×C to 1×1 for implementation with the Hellinger distance.

The Hellinger distance H(P, Q) between two distributions P and Q is generally defined as $$H^2(P, Q) = \frac{1}{2} \int \left( \sqrt{\frac{dP}{d\lambda}} - \sqrt{\frac{dQ}{d\lambda}} \right)^2 d\lambda.$$

For discrete (or discretized) distributions, the Hellinger distance has the form of:

$$H(F^{new}_{c\,1}, F^{new}_{c\,2}) = \frac{1}{\sqrt{2}} \sqrt{\sum_{i=1}^{n+1} \left( \sqrt{F_c^1(t_i^c) - F_c^1(t_{i-1}^c)} - \sqrt{F_c^2(t_i^c) - F_c^2(t_{i-1}^c)} \right)^2},$$

where $t_0 = -\infty$ and $t_{n+1} = \infty$.

In the case when $d_{aggr}$ is equal to the sum of $d_1^2, \ldots, d_C^2$ (sum of squared distances) then $$d_{aggr} = \sum_{c=1}^{C} d_c^2 = \sum_{c=1}^{C} H(F^{new}_{c\,1}, F^{new}_{c\,2})^2 ==$$

$$\sum_{c=1}^{C} \left( \frac{1}{\sqrt{2}} \cdot \sqrt{\sum_{i=1}^{n+1} \left( \sqrt{F_c^1(t_i) - F_c^1(t_{i-1})} - \sqrt{F_c^2(t_i) - F_c^2(t_{i-1})} \right)^2} \right)^2 ==$$

$$\sum_{c=1}^{C} \sum_{i=1}^{n+1} \left( \frac{1}{\sqrt{2}} \cdot \sqrt{F_c^1(t_i) - F_c^1(t_{i-1})} - \frac{1}{\sqrt{2}} \cdot \sqrt{F_c^2(t_i) - F_c^2(t_{i-1})} \right)^2 =$$

$$\sum_{c=1}^{C} \sum_{i=1}^{n+1} \left( v_1^{c,i} - v_2^{c,i} \right)^2$$

where $$v_k^{c,i} = \frac{1}{\sqrt{2}} \cdot \sqrt{F_c^k(t_i) - F_c^k(t_{i-1})},$$

$F_c^k(\cdot)$ is a cumulative distribution function of the discretized distribution of the channel map c of input k, $t_i$ are points (value ranges) for distribution function evaluation, $t_0 = -\infty$ (and hence $F_c^k(t_0) \equiv 0$), and $t_{n+1} = \infty$ (and hence $F_c^k(t_{n+1}) \equiv 1$).

Since the Hellinger distance is reduced to a simple sum of squared differences, Principal Component Analysis (PCA) can be applied to reduce the number of computations. Namely, applying the PCA is equal (corresponds) to the calculation of the sum of squared differences in the projection onto some subspace instead of the initial space.

For example, the estimation of $d_{aggr}$ is reduced to the sum of squares, which can be rewritten as follows:

$$d_{aggr} = \sum_{c=1}^{C} \sum_{i=1}^{n+1} \left( v_1^{c,i} - v_2^{c,i} \right)^2 = \sum_{j=1}^{C \cdot (n+1)} \left( v_1^j - v_2^j \right)^2 = \|v_1 - v_2\|_{l_2}^2,$$

where $\|\cdot\|_{l_2}$ is a $l_2$-norm.

Considering v-s as points in the Euclidian $\mathbb{R}^{C \cdot (n+1)}$ space and evaluating their values for a big quantity of inputs to obtain enough statistics, we can fit PCA on these points. Once PCA is fitted it can be applied to obtain new points in the Euclidian space $\mathbb{R}^m$, $m \ll C \cdot (n+1)$ by the matrix-vector dot-product $$\mu = Mv^{\tau},$$

where M is a matrix of shape $m \times C(n+1)$ and $l_2$-norm of each matrix row is equal to 1. This equality implies that $\mu$ is a vector of coordinates of the projection of the point v on the subspace whose basis vectors coordinates are defined by the rows of matrix M.

So if PCA is applied to obtain new $d'_{aggr}$ then it becomes $d'_{aggr} = \|Mv_1^{\tau} - Mv_2^{\tau}\|_{l_2}^2$, which is equal to the squared $l_2$-distance between projections of $v_1$ and $v_2$ on the subspace whose basis vectors coordinates are defined by the rows of matrix M.

Since m (the dimensionality of the subspace for projections) can be any then we can project all the points on the line (one-dimension subspace). Thus, we can map the whole n·C values that define discretized distributions to one value.

In summary, the new space may determined by the PCA. Thus, all the v values may be projected to a line in $\mathbb{R}^{n \cdot C}$ space. Hence the v values may be embedded e.g. as one float (coordinate of the projection point on the line). In other words, the space dimensions may be reduced by the PCA so that the distance is calculated in a space with less dimensions, e.g. between projections on one line.

The exemplary pipeline is as follow:
1. Choose the layer (K) for statistics, choose the number n and positions of ticks for the distribution.
2. (Optional) If a system requires fast calculations, then the number of operations during production can be reduced using Hellinger distance and aggregation in the form of sum of squares+PCA. Values in ticks are estimated from the previous step for big number of inputs to fit the PCA, but this process is predetermined. The PCA is fitted by the fixed formulas.
3. The new similarity function depends on the second step. Its parameters are determined with regard to the formula of d_aggr.

The Hellinger distance and the PCA are means to simplify the calculation. However, they are only exemplary and optional. The present disclosure may work with other distances and does not need to apply the PCA.

Consequently, the Hellinger distance can be approximated with a binary function (specifically, $l_2$-distance on the line), which requires only a slightly more additional computational power in comparison with the original similarity function.

In summary, according to an exemplary implementation, the distance value is calculated by approximating the Hellinger distance as a sum of squared differences projected to a space reduced by applying Principal Component Analysis.

A specific tensor ordinal number K depends on the network architecture and complexity of the middle-level features. Next, it is described how to obtain distributions from any tensor.

Let us consider values of the channel map c of a tensor/as values of a random variable $\xi_c^l$. The aim is to estimate the distribution function $F_c^l$ of values on each channel map c of the tensor l. Since any number of the correct inputs (inputs that are in distribution) may be used the distribution function can be approximated as follows, employing normalization by computing a proportion:

$$F_c^l(x) = P(\xi_c^l \leq x) =$$
$$\frac{\text{number of values that are less than } x(\text{on channel } c \text{ and layer } l)}{\text{total number of proceeded values (on channel } c \text{ and layer } l)}$$

In other words, in order to obtain the estimated distribution function independent of the number of values used for the estimation, normalization by the number of values is performed. Distribution function have certain properties, which are then satisfied. For example, a cumulative distribution function returns values between 0 and 1, whereas the area of a probability density function sums up to one.

In order to estimate a continuous distribution function by a discrete distribution function, the value range has to be discretized. This may be performed in various different manners. For example, a number n of points (defining the resolution of the distribution function) may be selected so that the points are equidistantly spaced alongside the value range. The value range is a range in which the values of the K-th intermediate tensor are located. Then values which fall into an interval between two neighboring points are counted for all intervals, resulting in estimated discrete distribution function indicating frequency of occurrence of the values falling into the respective intervals. However, the present disclosure is not limited to equidistant selection of the points corresponding to intervals of the same size. While such approach works and is simple, it may be advantageous to select the points with regard to the frequency of occurrences of the values.

For instance, in among (a rather small) number of floats points $(t_1, \ldots, t_n)$ may be chosen and then applied the transformation $F_c^l(x) \to (F_c^l(t_1), \ldots, F_c^l(t_n))$. Positions of points may be denser near the median of the distribution (or near the mean or the like). In other words, the distribution function for the more frequent values has a higher resolution corresponding to smaller intervals and denser points defining the intervals.

For example, the choice of the points can be as follows:

$s_{bot}^c := std(\xi_c^l | \xi_c^l < E\xi_c^l)$;

$s_{top}^c := std(\xi_c^l | \xi_c^l > E\xi_c^l)$;

with std(·) representing standard deviation from the mean value, i.e. expectation E of random variable $\xi_c^l$. Values $s_{bot}^c$ and $s_{top}^c$ represent, for c-th channel, standard deviation of the left and right part of the distribution with regard to the mean.

The number of points (resolution of the distribution function) may be determined as follows:

$$n' := \frac{\text{height of the layer} * 4}{\text{height of the penultimate layer}},$$

Herein, the height of the layer is the height H' of the tensor in the K-th layer of the CNN. The height of the penultimate layer is the height of the (K−1)-th layer. For example n' may be $$\frac{28*4}{7} = 16$$

for unit2 from layer2 or me well-known ResNet described, for instance by He K. et al. Deep residual learning for image recognition //Proceedings of the IEEE conference on computer vision and pattern recognition.—2016.—pp. 770-778.

Moreover, the points (which may also be referred as ticks or thresholds) may be given by:

$$t_{n'+i+1}^c := E\xi_c^l + \left(\frac{i}{n'}\right)^P *(8*s_{top}^c), i \in \{0, \ldots, n'\};$$

$$t_{n'-i+1}^c := E\xi_c^l - \left(\frac{i}{n'}\right)^P *(8*s_{bot}^c), i \in \{1, \ldots, n'\}.$$

Here, P is a parameter that maximizes the sum of Shannon entropies of random variables $\vartheta_c^l := \min\{t_j^c | \xi_c^l \leq t_j^c\}$. The number 8 is exemplary. In general, a suitable value may be different, and may be experimentally determined beforehand (before the production phase) and then used as a predefined value. Instead of 8, other values, e.g. from the interval between 0.5 and 16 may be used. Shannon entropy H(X) of a discrete random variable X is defined as:

$$H(X) = -\sum_{i=1}^{n} P(x_i) \cdot \log P(x_i)$$

with $P(x_i)$ being probability of X having value of $x_i$. The log function may have a basis 2 in which case the unit of the entropy is bit. However, the basis of the logarithm and the units can be also different.

Thus, parameter P makes ticks positions more informative since each point contributes equally to the distribution.

Figure 6:
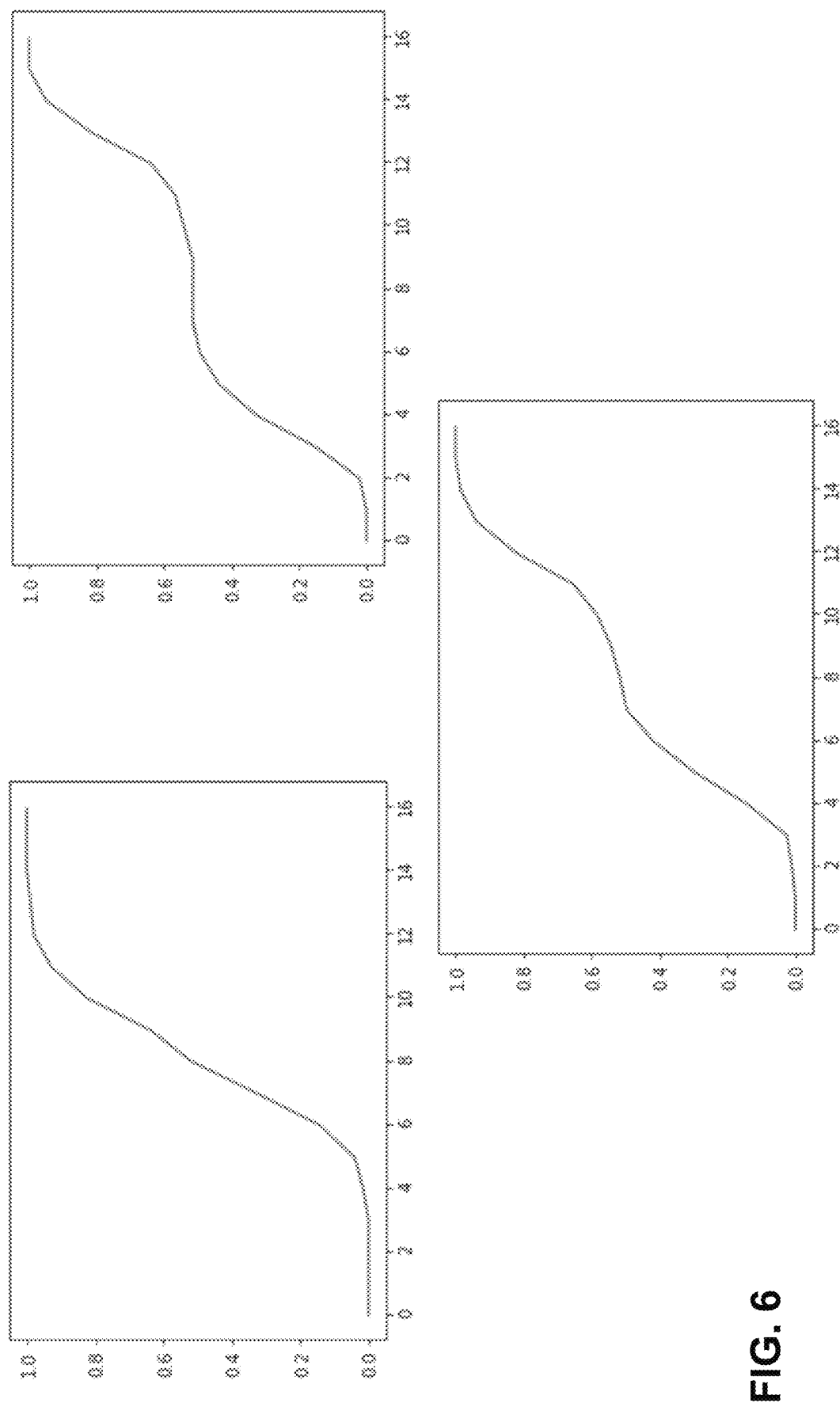
FIG. 6 is an illustrative representation of three different cumulative distribution functions.

FIG. 6 illustrates example of a small P (top left), a big P (top right) and an optimal P (bottom). On the x-axes, a number i of tick $t_i^c$ is shown. On the y-axes, a value $F_c^l(t_i^c)$ is shown.

Using the points determined in the previous step, the tensor $T_{dist}$ of discretized distribution for the input X is evaluated as follows:

$$T_{dist}(X) = \begin{pmatrix} F_1^l(t_1^1) & \ldots & F_1^l(t_n^1) \\ \ldots & \ldots & \ldots \\ F_C^l(t_1^C) & \ldots & F_C^l(t_n^C) \end{pmatrix}.$$

This tensor sets C distributions $F_c^X$ where $$F_c^X(x) = \begin{cases} 1, & x \geq t_n^c, \\ \max\{F_c^l(t_i^c) | x \geq t_i^c\}, & t_n^c > x \geq t_1^c, \\ 0, & x < t_1^c. \end{cases}$$

Finally, the obtained distributions can be compared by using any distribution distance or divergence as described above.

In summary, the obtaining of the n value intervals may include at least one of (i) the number n based on the dimensions of the first feature tensor, and (ii) determining the value interval length based on entropy of the first feature tensor values.

It is noted that entropy is only one of possibilities, which may provide the advantage of adapting the resolution of the distribution function to the frequency of occurrence of the values. However, the present disclosure is not limited by such approach and in general other statistics different from entropy may be used, or the intervals may be selected according to a predefined criterion, e.g. equidistantly. The number n may be fixed or selected based on other criteria than the dimensions (or one dimension) of the K-th tensor.

In order to choose the tensor (i.e. the value of K) to be used to obtain discrete distributions, a set of OOD examples may be evaluated. The set of OOD examples may include correct inputs (ODD), which are rare in the normal training datasets. The training set of the ODD examples should advantageously have at least hundreds of examples. Generating such data is out of the scope of the present disclosure, but is known to a skilled person in the context of neural network training. In addition, a similarly large dataset may be provided for the in-distribution examples.

Using the two data sets the best tensor may be determined as follows:
a) The average discretized distribution functions $F_{aver_c}^l$, $c \in \{1, \ldots, C_l\}$ are generated using all in-distribution examples for each tensor 1. As mentioned above, a tensor output by a layer l is an l-th tensor.
b) The aggregated values of distributions distances/divergences $d_{aggr}^l(X)$ (e.g. sum of the squared Hellinger distances) between $F_{aver_c}^l$, $c \in \{1, \ldots, C_l\}$, and distributions of each input X (OOD inputs as well as in-distribution inputs) for each tensor l are calculated.
c) Next, the problem is considered as a binary classification task where only one explanatory variable is available $-d_{aggr}^l(X)$. In other words, according to the value of the variable $d_{aggr}^l(X)$ it is decided whether the input belongs to an OOD class or an in-distribution class. In particular, if the value of $d_{aggr}^l(X)$ is larger or equal to a threshold, the input data used to calculate $d_{aggr}^l(X)$ is classified as ODD, otherwise as in-distribution.
d) A tensor l is then chosen (selected as the K-th tensor) for which the best binary classification rate can be achieved for inputs using their aggregated values of distributions distances/divergences $d_{aggr}^l(X)$ to $F_{aver_c}^l$, $c \in \{1, \ldots, C_l\}$, according to some metric, e.g. accuracy, F1-score, etc. For example, a metric such as FPR at TPR=90% may be used.

The above example concerning finding the K is not limiting. However, this approach enables finding the appropriate tensor to be analyze for a particular application/desired accuracy and/or complexity or other criteria.

In other words, the method may further comprise determining of the at least one layer of the neural network as the layer of which the output feature tensor provides the maximum classification accuracy. It is noted that in the above description, only a single layer (and the corresponding tensor) is selected and used. However, the present disclosure is not meant to be limited to only one layer. Rather, 2, 3, or more layers of the neural network may be analyzed by means of a discretized distribution, in a similar pipeline as shown for the single layer. The results may then be used separately or aggregated.

To find the new similarity a set of hard (meaning difficult to distinguish) pairs may be used, i.e. pairs of inputs from different classes whose original embeddings have high similarity and pairs from one class whose original embeddings have low similarities. In addition to the hard pairs, a bigger set of usual pairs may be provided that can be recognized correctly with different levels of confidence. Generating such data is out of the scope of our approach but in capabilities of a skilled person.

It may be advantageous to provide a function $\psi(s_1, d_{aggr})$ that is monotonically increasing for each variable. Here $s_1$ is an original similarity between the inputs, and $d_{aggr}$ is an aggregated value of distributions distances/divergences. Thus, inputs with a bigger initial similarity have a bigger new similarity. At the same time, the similarity for the inputs is increased, whose distributions of the middle-level features are far from each other. This is equal to the penalization for inputs with close distributions of the middle-level features.

Note that the initial similarity function is often bounded, e.g. in case of the cosine similarity, and distributions distances/divergences are often unbounded. That is why it may be advantageous to look for a $\psi(s_1, d_{aggr})$ function among functions that can be represented as a $\psi(s_1, \min(d_{aggr}, \theta))$ for some value B.

To make the new similarity function fast and to prevent overfitting, it may be advantageous to look for it among functions that can be represented as $\psi(s_1, d_{aggr}) = p_1(s_1) + w \cdot p_2(\min(d_{aggr}, \theta))$, where $p_i(x) = x^{a_i}$ and $a_1$ and $a_2$ are (positive) integer parameters and w and $\theta$ are predetermined parameters. They may be floating point parameters or integer parameters, depending on particular implementation. Parameter $\Theta$ is a predetermined maximum distance.

The problem may be considered to correspond to a binary classification task (the classes are pairs from one class and pairs from different classes) where only one explanatory variable is available, namely $\psi(s_1, d_{aggr})$. Then the best combination of parameters $a_1$, $a_2$, w, $\theta$ is selected according to some metric, e.g. accuracy, F1-score, etc (accuracy in our implementation). Such new similarity metric can then be used for the particular application for which the parameters have been optimized, such as face recognition or general object recognition or another specific object recognition, e.g. car recognition.

The above-mentioned exemplary new similarity function is not to limit the present disclosure. Rather, other functions may be used. In general, any similarity metric may be employed, which is a function of the distance between the distributions of an output tensor from a predetermined layer (K). The new similarity metric may be further a function of a feature tensor obtained by processing the first input data with all layers of the neural network and/or a feature tensor obtained by processing the second data with all layers of the neural network. In particular, the function may be a monotonically increasing function of the distance value $d_{aggr}$.

It is noted that in the above described examples of FIGS. 1, 2, and 4, the first input data is image data including C channels with C being an integer equal to or larger than 1. In other words, the present disclosure may operate with only one channel such as luminance in case of image input. However, it may operate with more channels such as color channels or other channels. Moreover, as shown in the examples above, the layer from which a tensor is analyzed, as well as further parameters may be selected in accordance with the application and the type of data, which is input to the neural network. This does not necessarily have to be image data. Audio or text data, or other kinds of data or feature data may also be used.

In case of a plurality of channels, according to an embodiment (as exemplified, e.g. in FIGS. 1, 2, and 4), the steps of processing the first input data, estimating a first distribution of the obtained first feature tensor, and determining a distance value (e.g. a metric) are performed separately for each channel c (among channels 1 to C). The determining of the characteristic of the first input data is based on an aggregation of the distance values determined for each channel.

For example, averaging can be used when processing several instances of one class. When combining distributions from several channels (including solo input-instance processing), aggregation may be used such as the sum of squares with the Hellinger distance. Since Hellinger distance applies square roots, squares may be particularly easy to determine. However, other forms of aggregation may be used.

As mentioned above, the present disclosure may be used for face recognition.

The present disclosure may be implemented by means of a method as mentioned above. However, the embodiments and exampled of the present disclosure may also be implemented as various apparatuses. For example, a signal processing apparatus may be provided for processing first input data by a neural network. The signal processing apparatus comprises (or consists of) processing circuitry configured to: process the first input data by at least one layer of the neural network to obtain a first feature tensor; estimate a first distribution of the obtained first feature tensor; obtain a second distribution; determine a distance value indicative of a distance between the first distribution and the second distribution; and determine a characteristic of the first input data based on the determined distance value.

Figure 5:
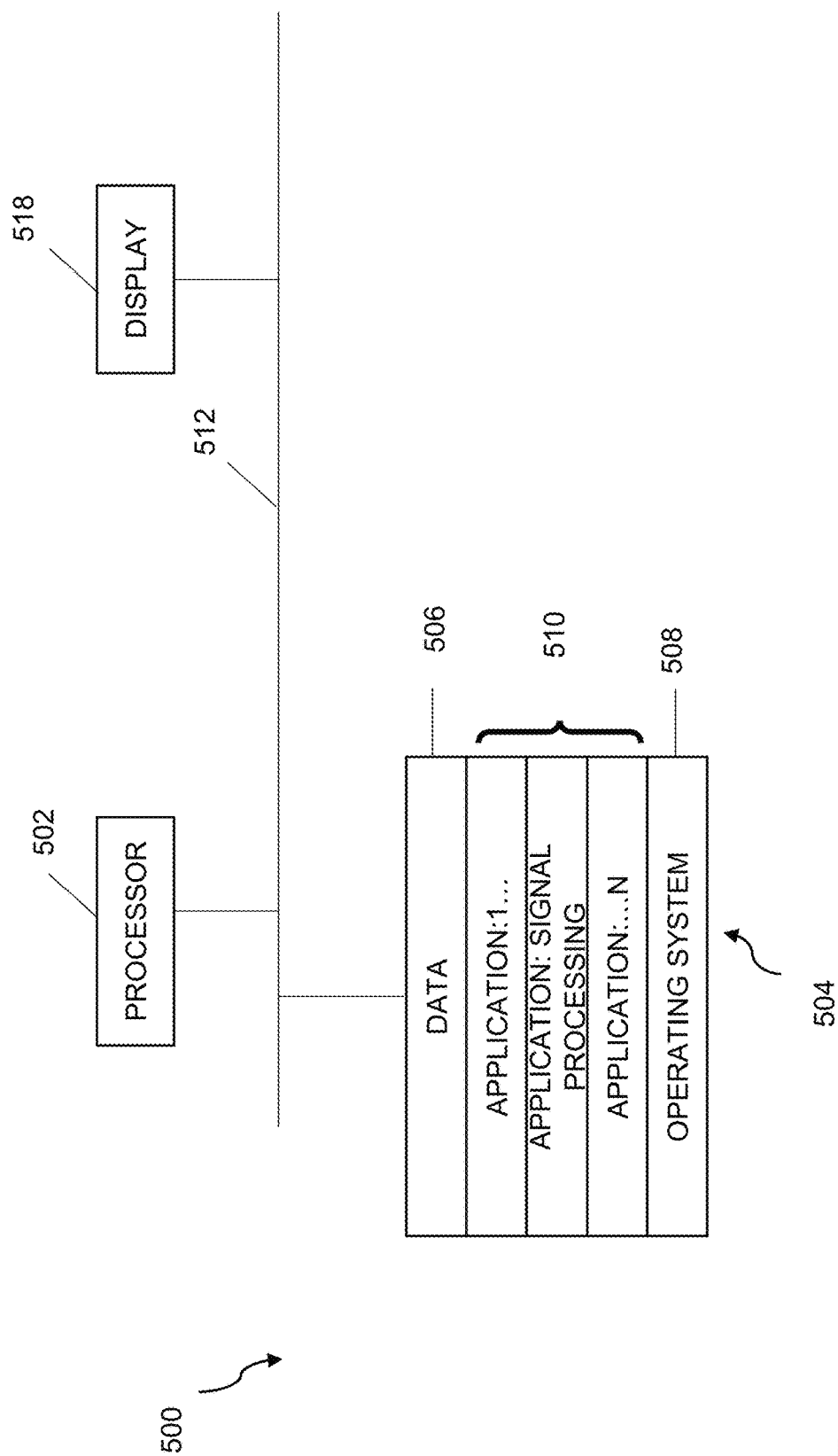
FIG. 5 is a block diagram illustrating an example of an apparatus.

FIG. 5 is a simplified block diagram of an apparatus 500 that may be used as the signal processing apparatus from FIGS. 1 and 2 or FIG. 3 or FIG. 4 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. The memory may be internal or external to the processing circuitry (with one or more processors) and may be implemented on the same chip or separately. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a signal processing application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Embodiments and functions described herein, e.g. with reference to FIGS. 1 to 4, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

An exemplary implementation provides a signal processing apparatus for processing first input data by a neural network with the following functional modules which may be implemented in any hardware and/or software means as mentioned above. The signal processing apparatus is shown in FIG. 3B and comprises a neural network 360 for processing the first input data by at least one layer of the neural network to obtain a first feature tensor. The neural network may be any kind of neural network suitable for processing the first input data. For example, it may be a CNN for processing von image data. The neural network may have an interface/output for providing to other functional modules the K-th tensor (first feature tensor) as is shown in detail in FIGS. 1, 2, and 4.

Moreover, the signal processing apparatus comprises a distribution estimator 370 for estimating a first distribution of the obtained first feature tensor and an input 375 for obtaining a second distribution. The second distribution may be obtain similarly as the first distribution, i.e. by estimating the distribution from a tensor of a second image. Alternatively, the second distribution is pre-determined distribution obtained based on a plurality of (training) data, e.g. a centroid of a class or an average distribution or the like.

The signal processing apparatus further comprises a distance determination unit 380 for determining a distance value indicative of a distance between the first distribution and the second distribution; and a characteristic determination unit 390 for determining a characteristic of the first input data based on the determined distance value. The function of these modules is described above in details.

The present disclosure including methods and apparatuses employs a discretized (estimated) distribution of the intermediate tensor values. This constitutes an additional signal processing compared to usual deployment of the neural networks. The embodiments of the present disclosure may be used only for the inference (production phase), while the learning (training) is made in a usual way, i.e. according to any well-known training approach. The present disclosure may be implemented for any computer vision deep-learning-based task using the same pipeline. It can be used for the open-set recognition tasks as well as closed-set recognition tasks.

The determining of the characteristic of the first input data (e.g. input image) may correspond to determining of a class among a plurality of predetermined classes of data. This may be an open-set or a closed-set classification.

Alternatively, or in addition, the determining of the characteristic of the first input data may correspond to determining whether or not the first input data belong to one of the predetermined classes of data. This enables distinction between the out of distribution and in distribution cases of the first input data.

Further embodiments and exemplary implementations may provide additional effects and advantages. For example, as explained above, in the case of Hellinger distance, the required operations can be reduced to one binary operation. The selection of optimum parameters can be performed by an algorithm (and thus automated) for the parameters selection. Thus, optimal parameters can be adjusted on the end device. For example, the intermediate tensor K can be selected to achieve best distinction between the desired features. The resolution of the discretized distribution may be selected according to the selected tensor.

Figure 7:
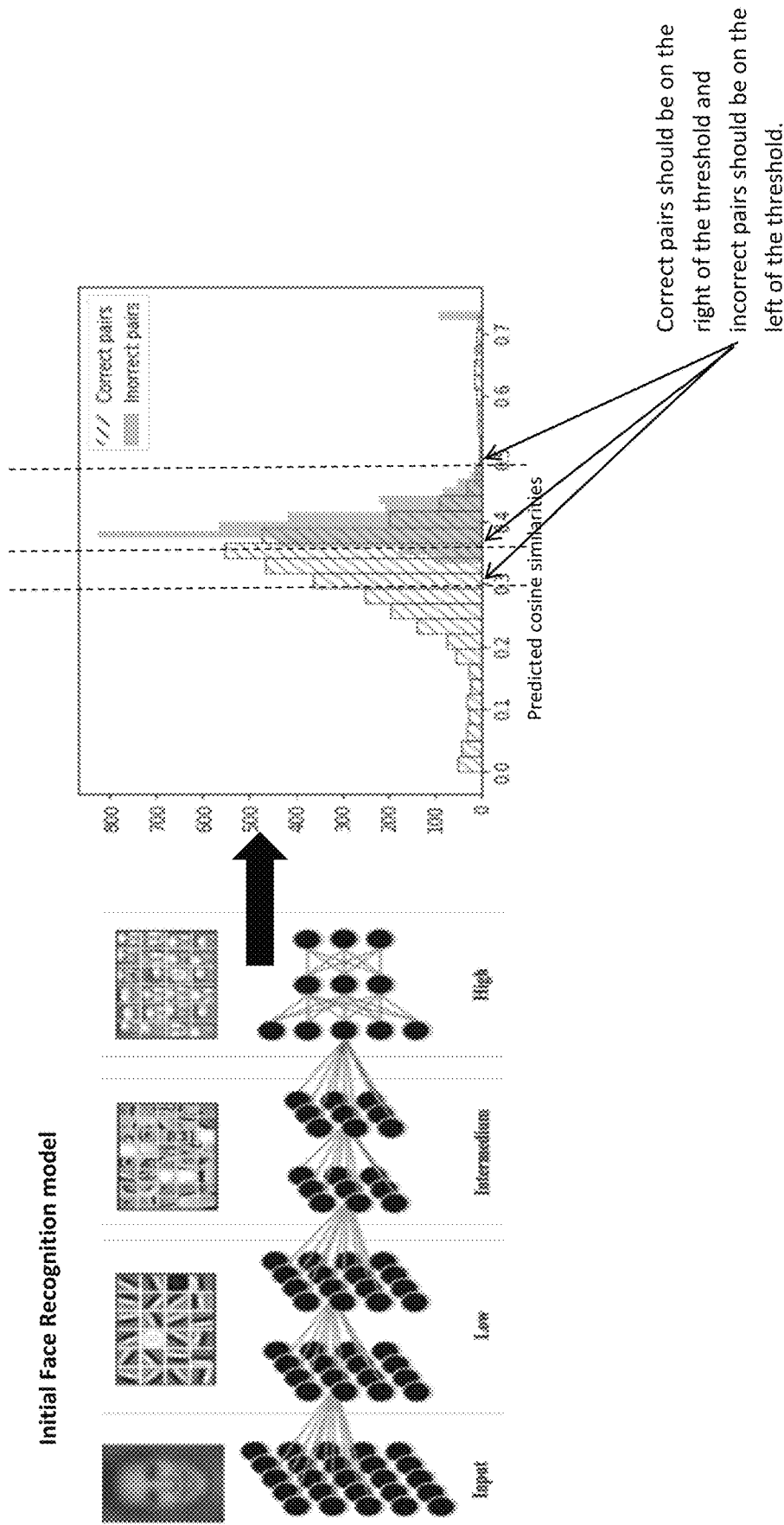
FIG. 7 is a schematic drawing illustrating weak separation of correct and incorrect data set pairs.
Figure 8:
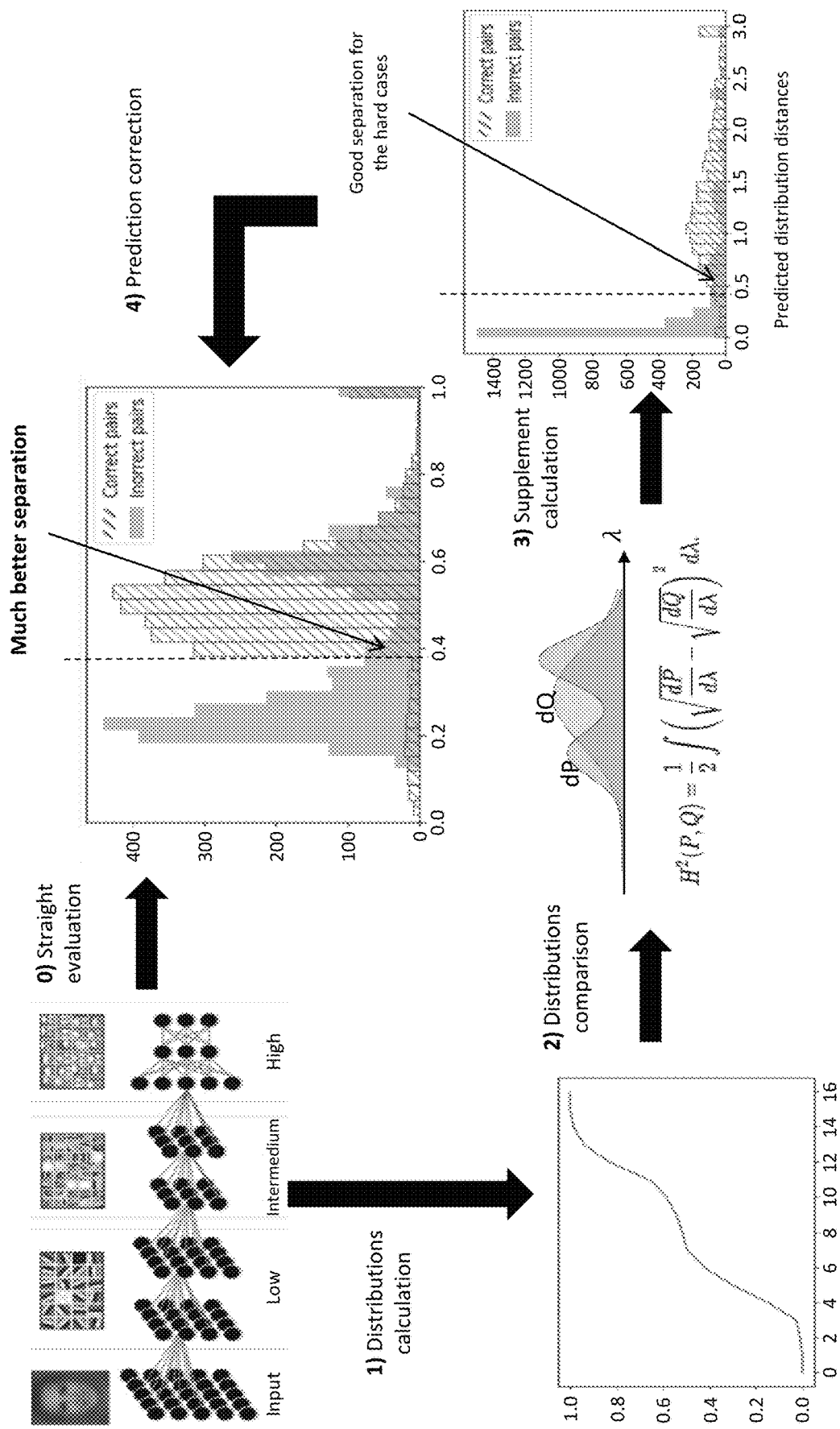
FIG. 8 is a schematic drawing illustrating an improved separation of correct and incorrect data set pairs.
Figure 9:
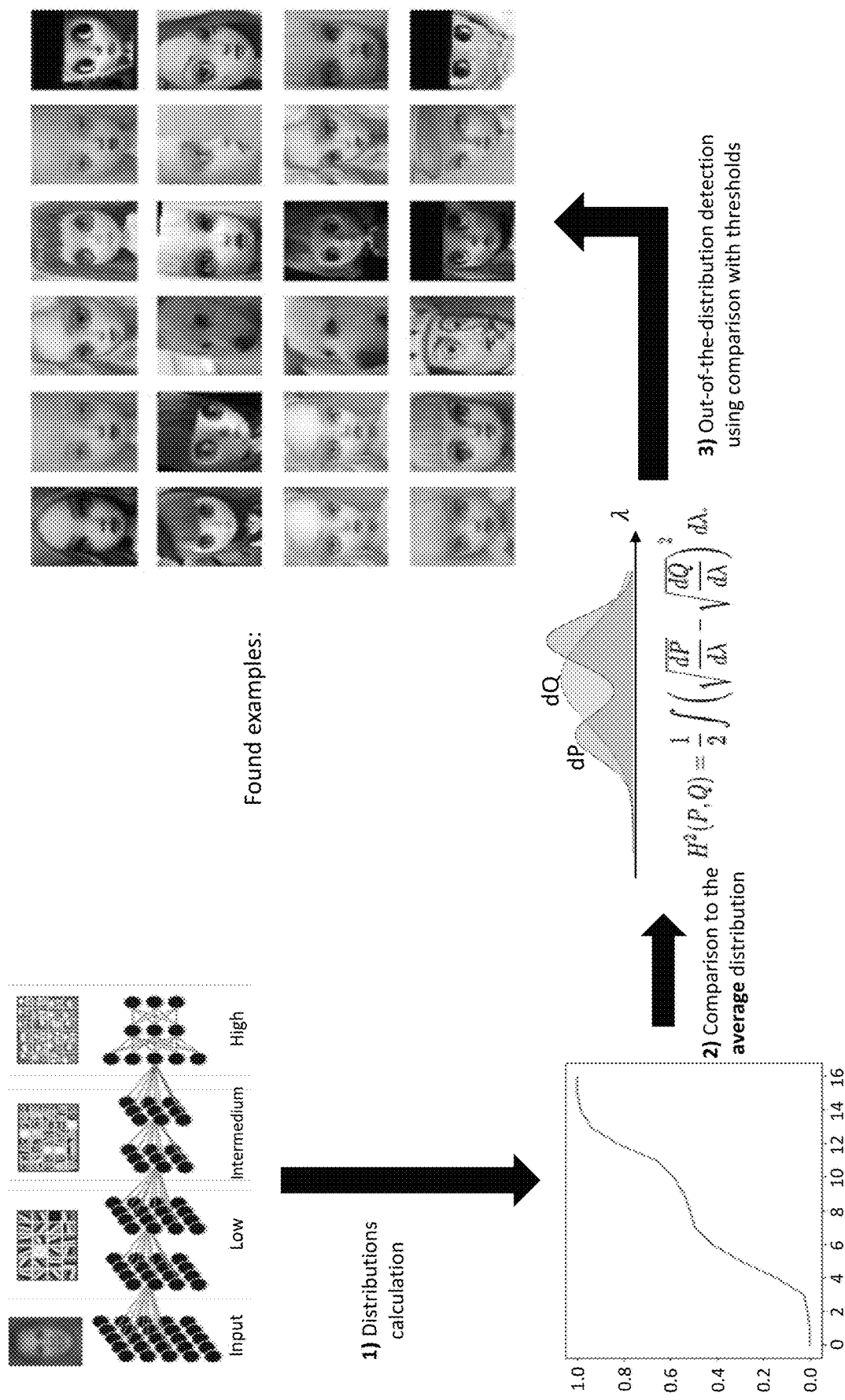
FIG. 9 is a schematic drawing illustrating particular examples of some rare dataset images detected as out of distributions.

FIGS. 7 to 9 is a schematic drawing illustrating the effects to the embodiments described above.

FIG. 7 shows a neural network constituting in the initial face recognition model. Input layer is input a face image. The face image may be a "hard case", difficult to recognize. As mentioned above, children faces or elderly people faces may be difficult to recognize. Moreover, some unusual faces or computer graphics faces or animal cases may be difficult to recognize or distinguish from human faces. This may be important in applications such as a faceID or other applications employing face recognition. Output of the input layer is passed through further (middle) layers of the initial face recognition model—low, intermediate and high. On the right side, a distribution of estimated cosine similarity is shown between pairs of output (or high-level) features of the input data including correct pairs (which are supposed to be similar) and incorrect pairs (which are not supposed to be similar). As can be seen in the figure of the distribution for hard cases, the distribution of the similarity for correct pairs and incorrect pairs is overlapping and reversed to such extend that there is no easy possibility of setting a threshold which would allow for reliable distinction. Correct-pair similarities are on the left hand side in the figure, but in general they should be on the right hand side. Incorrect-pair similarities should be on the left hand side. The faulty localization is because this a visualization is for hard cases. The approach of this disclosure moves at least some of the correct pairs to the right.

FIG. 8 illustrates schematically an employment of an embodiments of the present disclosure concerning comparison between input images. In addition to the straight evaluation 0), e.g. as described with regard to FIG. 7, further additional processing is performed. In particular, the distribution of features of a middle-layer, in this case intermediate layer, is calculated under 1) for the first image (dP) and the second image (dQ) of the pair. Then the distributions are compared under 2) and the new similarity (distance between the two distributions) is determined as shown under 3) as supplement to be used in aggregation with (and to correct) the similarity calculated under 0) to better distinguish between the correct and incorrect pairs.

FIG. 9 shows a schematic example of an embodiment for detecting out of distribution examples (input images). The steps 1) and 2) are the same as described with regard to FIG. 8. The distribution is compared with a predetermined distribution to decide whether the input data tensor distribution is sufficiently similar (in distribution) to the predetermined distribution or not under 3). Some examples found as out of distribution for human faces are shown on the top right hand side.

As mentioned above, the present disclosure is applicable to any kind of feed-forward neural network and to tasks including closed-set as well as open-set architectures.

An exemplary architecture of a neural network for a closed-set image recognition is shown in FIG. 10A. This architecture may be the same for the training phase and the inference phase. The input image 1010 with height H, width W and three input channels is input to a neural network. The neural network includes N convolutional layers 1110_1 to 1110_N. The first convolutional layer in this example output feature map with height H/2, width W/2 and 64 channels. The last convolution layer outputs a feature map with height 7 and width 7, and with S channels. Average pooling layer 1020 outputs a feature map with height 1, width 1 and S channels. The pooling operation calculates for each j between 1 and S the average of the 7×7 features. In step 1030, the 1×1×S tensor is flattened to a one dimensional feature vector of size S. The following layer is a fully-connected (dense) layer 1040 denoted as FC. The feature vector of length S is input to this layer, which dot multiplies this vector (as row vector) with a matrix of size S×K, resulting in a vector 1045 with size K. This vector is a vector including K similarities of the K respective classes. Here, (unlike in the above description) K corresponds to the number of classes in this closed-set model. As it is a closed-set model, the number of classes K remains the same during the training phase and the inference (production) phase.

The above described embodiments employing additional processing based on the distribution function of a middle layer may be implemented after any of the 1110_1 to 1110_N convolutional layers. The additional processing then outputs an additional similarity (or distance) for the K classes. The new similarity may then be calculated as a function of both, the similarity output from the neural network and the similarity obtained by the additional processing.

FIG. 10B shows an exemplary neural network architecture for open-set inference phase. Similar architecture is applicable for image recognition in FaceID. The input image 1010 and the convolutional NN layers 1110_1 to 1110_N are similar as described above with reference to FIG. 10A. In this architecture, there is no pooling layer. Rather, the output 7×7×S tensor of the last convolutional layer is flattened 1050 to a one-dimensional feature vector with having a size of 49S. Then, a fully connected (FC) layer 1060 multiplies the input vector of size 49S with a matrix of the size 49S×512. Here, 512 is a typically used value. However, the present disclosure is not limited to such value. Rather, for some applications, other sizes may be more suitable. The output feature vector 1065 with the size 512 (features) may then be stored for being compared with other such feature vectors (obtained from other input images) to assess similarity.

Similarly as in case of the architecture described with reference to FIG. 10A, the additional processing may be implemented after any of the 1110_1 to 1110_N convolutional layers. The additional processing then outputs an additional similarity (or distance). The new similarity may then be calculated as a function of both, the similarity output based on comparison of the feature vectors from the neural network and the similarity obtained by the additional processing.

Figure 10C:
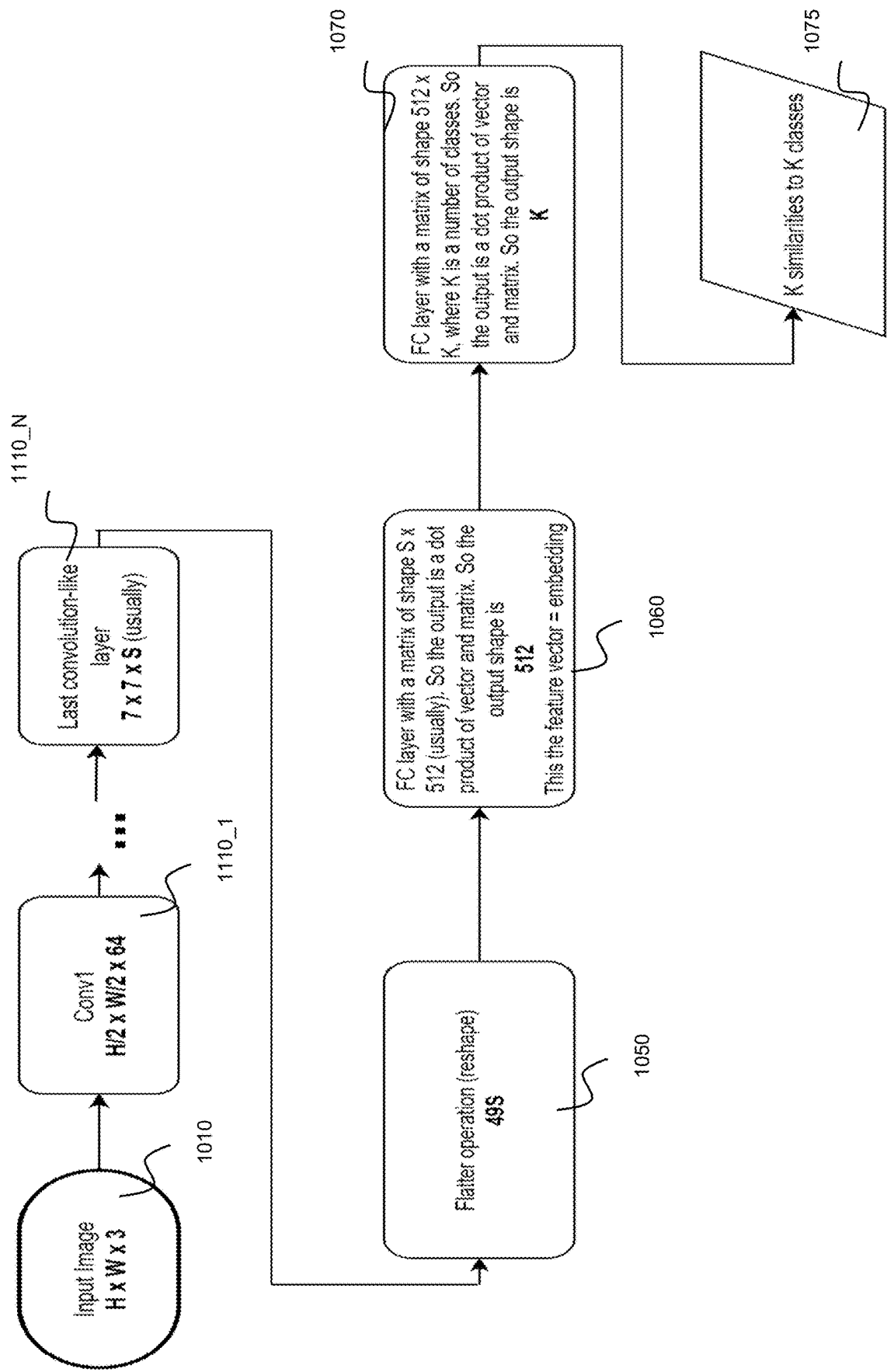
FIG. 10C is a schematic drawing illustrating training part of a neural network architecture for open-set image recognition.

FIG. 10C illustrates an exemplary neural network architecture for open-set training phase. The input image 1010 and the convolutional NN layers 1110_1 to 1110_N as well as the flattening layer 1050 and the first FC layer 1060 are similar as described above with reference to FIG. 10B. In addition, a second FC layer may be used for the training phase, which multiplies the feature vector of size 512 with a matrix of size 512×K. Thus, the result 1075 are similarities to the respective K classes which are trained in the training phase.

It is possible to use the additional processing also for the training purposes, for instance using architectures as shown in FIGS. 10A and 10C. In particular, it is possible to evaluate the new similarities $\psi$ ($s_1$, $d_{aggr}$) to the K classes during the training instead of the similarities $s_1$ (1045 and 1075).

It is noted that the NN architectures are only exemplary. In general, the dimensions of the feature maps and numbers of channels may differ. Moreover, presence of the FC layer 1040 may be unnecessary for some architectures. The same applies for the flattening layer 1030.

Summarizing, the present disclosure relates to processing input data by a neural network. Methods and apparatuses of some embodiments process the input data by at least one layer of the neural network and obtain thereby a feature tensor. Then, the distribution of the obtained feature tensors estimated. Another distribution is obtained. Such other distribution may be a distribution of another input data, or a distribution obtained by combining a plurality of distributions obtained for respective plurality of some input data. Then a distance value indicative of a distance between the two distributions is calculated and based thereon, a characteristic of the input data is determined. The characteristic may be pertinence to a certain class of data or a detection of out-of-distribution data or determination of reliability of a class determination or the like.

What is claimed is:

1. A method for processing first input data by a neural network, which is a feed-forward neural network, the method comprising:
   processing the first input data by at least one layer of the neural network to obtain a first feature tensor, wherein the first input data is image data including c channels with c being an integer equal to or larger than 1;
   estimating a first distribution of the obtained first feature tensor;
   obtaining a second distribution;
   determining a distance value indicative of a distance between the first distribution and the second distribution;
   determining a characteristic of the first input data based on the determined distance value, wherein
   the obtaining of the second distribution includes:
   processing of second input data by the at least one layer to obtain a second feature tensor; and
   estimating the second distribution of the obtained second feature tensor; and
   the second distribution is obtained by averaging of a plurality of distributions determined for respective plurality of input data belonging to a same class, and
   wherein determining of the characteristic of the first input data includes comparing the distance value with a threshold, and, based on the comparison, estimating reliability of the first input data belonging to said same class and wherein the set of classes are open and at least one new class is defined during processing.

2. The method according to claim 1, wherein the estimating of the first distribution includes:
   obtaining a number, n, of value intervals of the first feature tensor values, and
   determining, for each of the n value intervals, number of occurrences of values belonging to said value interval among the first feature tensor values.

3. The method according to claim 2, wherein the obtaining of the n value intervals includes at least one of (i) the number n based on the dimensions of the first feature tensor, and (ii) determining the value interval length based on entropy of the first feature tensor values.

4. The method according to claim 1, wherein, in the determining of the characteristic of the first input data, the characteristic is at least one of
   a class among a plurality of predetermined classes of data, and
   whether the first input data belong to one of the predetermined classes of data.

5. The method according to claim 1, wherein
the determining of the characteristic of the first input data comprises determining similarity of the first input data to the second input data by a similarity metric being a function of said distance value.

6. The method according to claim 5, wherein the similarity metric is further a function of at least one of a feature tensor obtained by processing the first input data with all layers of the neural network and a feature tensor obtained by processing the second data with all layers of the neural network.

7. The method according to claim 5, wherein the function is a monotonically increasing function of said distance value.

8. The method according to claim 7, wherein the function $\psi$ is given by $\psi(s, d) = p_1(s) + w \cdot p_2(\min(d, \Theta))$, with $p_i(x) = x^{ai}$, wherein ai is a positive integer, i is 1 or 2, w is a predetermined weight factor, $\Theta$ is a predetermined maximum distance.

9. The method according to claim 1, wherein, the determining of the characteristic of the first input data includes:
comparing the distance value with a threshold; and
based on the comparison, estimating reliability of the first input data belonging to said same class.

10. The method according to claim 1, wherein the distance value is calculated based on Hellinger distance.

11. The method according to claim 10, wherein the distance value is calculated by approximating the Hellinger distance as a sum of squared differences projected to a space reduced by applying Principal Component Analysis.

12. The method according to claim 1, further comprising determining of said at least one layer of the neural network as the layer of which the output feature tensor provides the maximum classification accuracy.

13. The method according to claim 1, wherein
the steps of processing the first input data, estimating a first distribution of the obtained first feature tensor, and determining a distance value are performed separately for each channel c; and
the determining of the characteristic of the first input data is based on an aggregation of the distance values determined for each channel.

14. The method according to claim 1, wherein the method is used for face recognition.

15. A non-transitory medium storing instructions which, when executed on one or more processors, perform steps comprising:
processing the first input data by at least one layer of the neural network to obtain a first feature tensor, wherein the first input data is image data including c channels with c being an integer equal to or larger than 1;
estimating a first distribution of the obtained first feature tensor;
obtaining a second distribution;
determining a distance value indicative of a distance between the first distribution and the second distribution;
determining a characteristic of the first input data based on the determined distance value, wherein
the obtaining of the second distribution includes:
processing of second input data by the at least one layer to obtain a second feature tensor; and
estimating the second distribution of the obtained second feature tensor; and
the second distribution is obtained by averaging of a plurality of distributions determined for respective plurality of input data belonging to a same class, and
wherein determining of the characteristic of the first input data includes comparing the distance value with a threshold, and, based on the comparison, estimating reliability of the first input data belonging to said same class and wherein the set of classes are open and at least one new class is defined during processing.

16. A signal processing apparatus for processing first input data by a neural network, which is a feed-forward neural network, the signal processing apparatus comprising processing circuitry configured to:
process the first input data by at least one layer of the neural network to obtain a first feature tensor, wherein the first input data is image data including c channels with c being an integer equal to or larger than 1;
estimate a first distribution of the obtained first feature tensor;
obtain a second distribution;
determine a distance value indicative of a distance between the first distribution and the second distribution;
determine a characteristic of the first input data based on the determined distance value, wherein
the obtain of the second distribution includes:
process of second input data by the at least one layer to obtain a second feature tensor; and
estimate the second distribution of the obtained second feature tensor; and
the second distribution is obtained by averaging of a plurality of distributions determined for respective plurality of input data belonging to a same class, and
wherein determine the characteristic of the first input data includes compare the distance value with a threshold, and, based on the comparison, estimate reliability of the first input data belonging to said same class and wherein the set of classes are open and at least one new class is defined during processing.

* * * * *